United States Patent
Omori et al.

(10) Patent No.: US 8,089,665 B2
(45) Date of Patent: *Jan. 3, 2012

(54) OPTICAL SCANNING DEVICE MOVING GRAVITY CENTER OF PIXEL IN SUB-SCANNING DIRECTION, IMAGE FORMING APPARATUS HAVING LIGHT SOURCES, AND METHOD

(75) Inventors: Atsufumi Omori, Chigasaki (JP); Masaaki Ishida, Yokohama (JP); Yasuhiro Nihei, Yokohama (JP); Jun Tanabe, Yamato (JP)

(73) Assignee: Ricoh Company, Ltd., Tokyo (JP)

( * ) Notice: Subject to any disclaimer, the term of this patent is extended or adjusted under 35 U.S.C. 154(b) by 1068 days.

This patent is subject to a terminal disclaimer.

(21) Appl. No.: 11/925,292

(22) Filed: Oct. 26, 2007

(65) Prior Publication Data
US 2008/0123160 A1    May 29, 2008

(30) Foreign Application Priority Data
Oct. 27, 2006 (JP) ................................. 2006-292462

(51) Int. Cl.
*H04N 1/04* (2006.01)
(52) U.S. Cl. ........ 358/480; 358/474; 358/475; 358/509; 382/313; 347/133; 235/454
(58) Field of Classification Search .................. 358/474, 358/475, 509, 480, 514, 513, 518, 1, 15; 347/133; 382/186, 313; 235/454
See application file for complete search history.

(56) References Cited

U.S. PATENT DOCUMENTS

| 4,707,747 | A | * | 11/1987 | Rockwell, III | ................. 358/473 |
| 5,517,328 | A | | 5/1996 | Wilson | |
| 5,598,145 | A | * | 1/1997 | Shimotani et al. | ............. 340/576 |
| 5,900,863 | A | * | 5/1999 | Numazaki | ...................... 345/158 |
| 6,396,565 | B1 | * | 5/2002 | Yamamoto et al. | .............. 355/41 |
| 6,727,974 | B2 | * | 4/2004 | Nishikawa | ....................... 355/41 |
| 6,782,814 | B2 | * | 8/2004 | Tokiwa | .......................... 101/211 |
| 6,791,596 | B2 | | 9/2004 | Nihei et al. | |
| 6,833,939 | B1 | | 12/2004 | Ichikawa | |
| 6,927,789 | B2 | | 8/2005 | Ozasa et al. | |
| 6,933,957 | B2 | | 8/2005 | Omori et al. | |
| 7,173,234 | B2 | * | 2/2007 | Hiromatsu | .................... 250/226 |
| 7,212,224 | B2 | | 5/2007 | Nihei et al. | |
| 7,256,815 | B2 | | 8/2007 | Suzuki et al. | |
| 7,391,543 | B2 | * | 6/2008 | Ohara | ........................... 358/483 |
| 7,418,234 | B2 | * | 8/2008 | Murakami et al. | ............. 399/401 |
| 7,538,916 | B2 | * | 5/2009 | Tatsuno | ........................ 358/509 |
| 7,668,337 | B2 | * | 2/2010 | Fukaya et al. | ................ 382/100 |

(Continued)

FOREIGN PATENT DOCUMENTS
JP              7-174995 A        7/1995
(Continued)

*Primary Examiner* — Negussie Worku
(74) *Attorney, Agent, or Firm* — Dickstein Shapiro LLP

(57) ABSTRACT

An optical scanning device includes n-odd (n≧2) light sources disposed at different positions at least in a sub-scanning direction, a pixel forming part in which one pixel is depicted by light beams emitted from m-odd (n≧m≧2) light sources of the n-odd light sources and a distance of adjacent light sources for emitting the light beams in the sub-scanning direction is less than 5 µm, and a light source driving control part configured to control an emitting state of the light sources for depicting the one pixel and conduct an emission driving control for moving a gravity center of the one pixel in the sub-scanning direction.

20 Claims, 27 Drawing Sheets

U.S. PATENT DOCUMENTS

| | | |
|---|---|---|
| 2003/0067533 A1 | 4/2003 | Omori et al. |
| 2004/0036762 A1 | 2/2004 | Nihei et al. |
| 2004/0118311 A1* | 6/2004 | Tokiwa ............................ 101/485 |
| 2005/0024468 A1* | 2/2005 | Ohba et al. ...................... 347/133 |
| 2005/0089069 A1 | 4/2005 | Ozasa et al. |
| 2005/0099522 A1* | 5/2005 | Kondo et al. .................... 348/345 |
| 2005/0146596 A1 | 7/2005 | Nihei et al. |
| 2005/0212950 A1* | 9/2005 | Kanai ............................... 348/345 |
| 2005/0219354 A1 | 10/2005 | Omori et al. |
| 2005/0243163 A1 | 11/2005 | Ozasa et al. |
| 2005/0274897 A1* | 12/2005 | Singer et al. ................... 250/372 |
| 2006/0008295 A1* | 1/2006 | Kohchi et al. .................. 399/144 |
| 2006/0044625 A1* | 3/2006 | Ohara ............................. 358/474 |
| 2006/0192843 A1* | 8/2006 | Ohba .............................. 347/238 |
| 2006/0197822 A1* | 9/2006 | Sakurai .......................... 347/118 |
| 2006/0209170 A1 | 9/2006 | Nihei |
| 2006/0285186 A1 | 12/2006 | Ishida et al. |
| 2007/0030548 A1 | 2/2007 | Nihei et al. |
| 2007/0091163 A1 | 4/2007 | Omori et al. |
| 2007/0132828 A1 | 6/2007 | Ishida et al. |
| 2007/0145233 A1* | 6/2007 | Kaihotsu ........................ 250/205 |
| 2008/0210888 A1* | 9/2008 | Inoue et al. .................. 250/492.22 |
| 2009/0141761 A1* | 6/2009 | Egawa ........................... 372/38.02 |
| 2009/0263736 A1* | 10/2009 | Inoue et al. ...................... 430/30 |

FOREIGN PATENT DOCUMENTS

| | | |
|---|---|---|
| JP | 10-16308 A | 1/1998 |
| JP | 10-221618 A | 8/1998 |
| JP | 10-235928 | 9/1998 |
| JP | 2001-215423 A | 8/2001 |
| JP | 2001-272615 | 10/2001 |
| JP | 2001-350111 | 12/2001 |
| JP | 2003-072135 | 3/2003 |
| JP | 2005-037575 | 2/2005 |
| JP | 2005-70067 A | 3/2005 |
| JP | 3644923 B2 | 5/2005 |
| JP | 2005-234510 A | 9/2005 |

* cited by examiner

FIG. 10

| CORRECTION DATA | CONTROL PATTERN | LIGHT SOURCE A | LIGHT SOURCE B | CORRESPONDING PIXEL (FIG. 4) |
|---|---|---|---|---|
| (001) | CONTROL PATTERN 1 | IMAGE DATA 0 | IMAGE DATA 8 | PIXEL 1 |
| (010) | CONTROL PATTERN 2 | IMAGE DATA 2 | IMAGE DATA 6 | PIXEL 2 |
| (011) | CONTROL PATTERN 3 | IMAGE DATA 3 | IMAGE DATA 5 | PIXEL 3 |
| (100) | CONTROL PATTERN 4 | IMAGE DATA 4 | IMAGE DATA 4 | PIXEL 4 |
| (101) | CONTROL PATTERN 5 | IMAGE DATA 5 | IMAGE DATA 3 | PIXEL 5 |
| (110) | CONTROL PATTERN 6 | IMAGE DATA 6 | IMAGE DATA 2 | PIXEL 6 |
| (111) | CONTROL PATTERN 7 | IMAGE DATA 8 | IMAGE DATA 0 | PIXEL 7 |

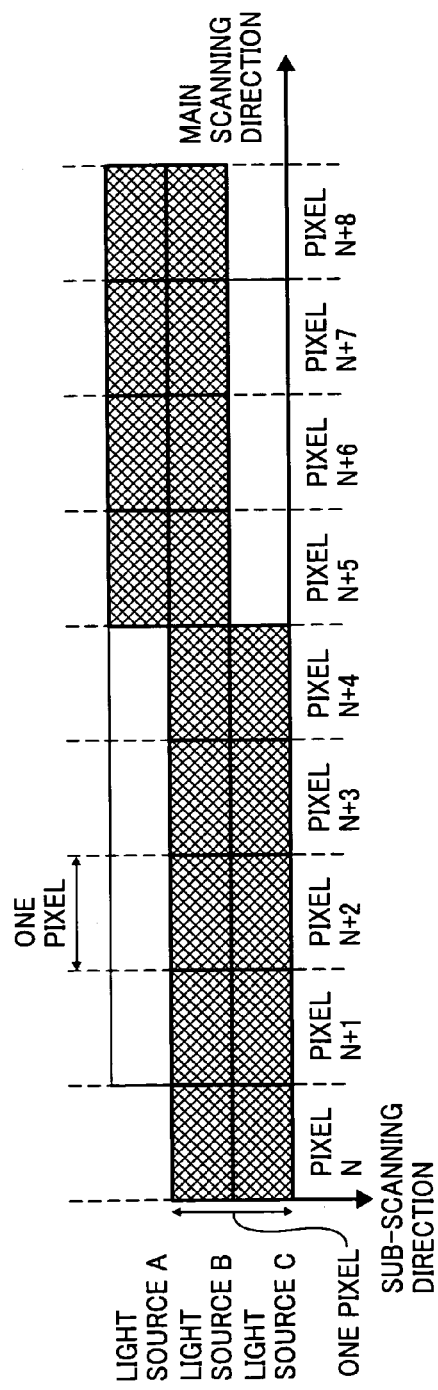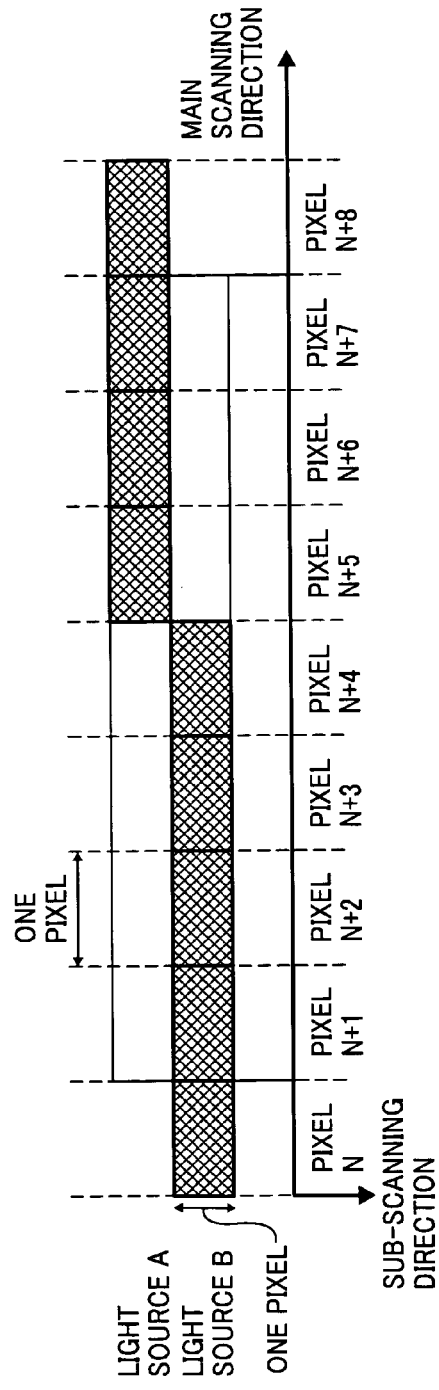

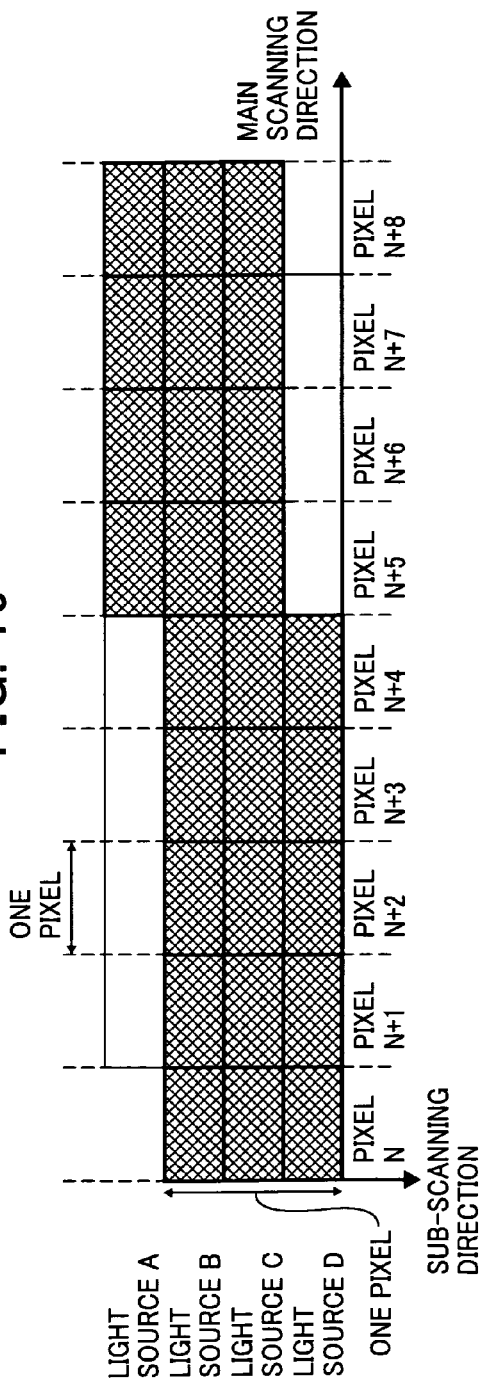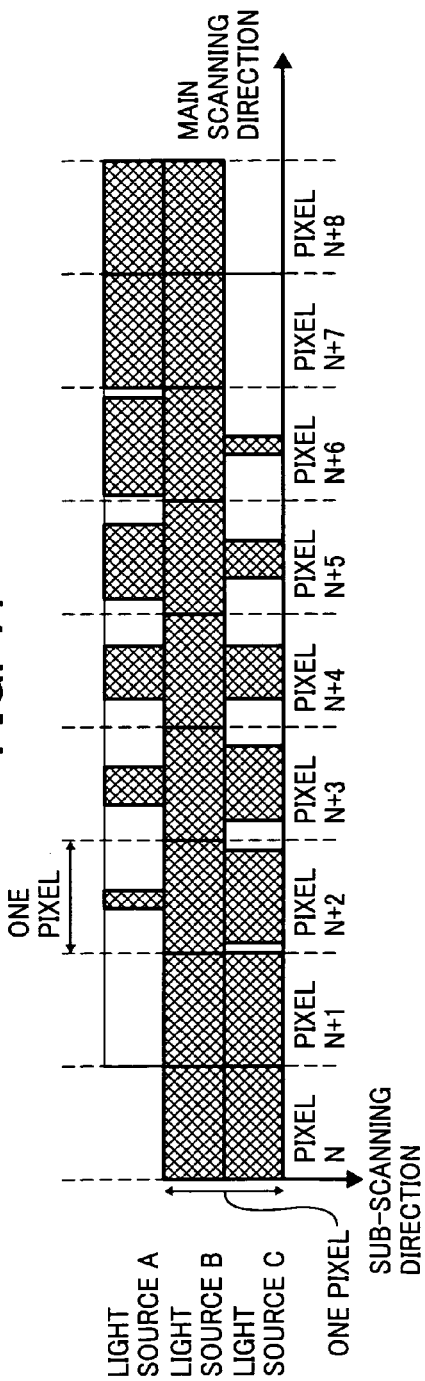

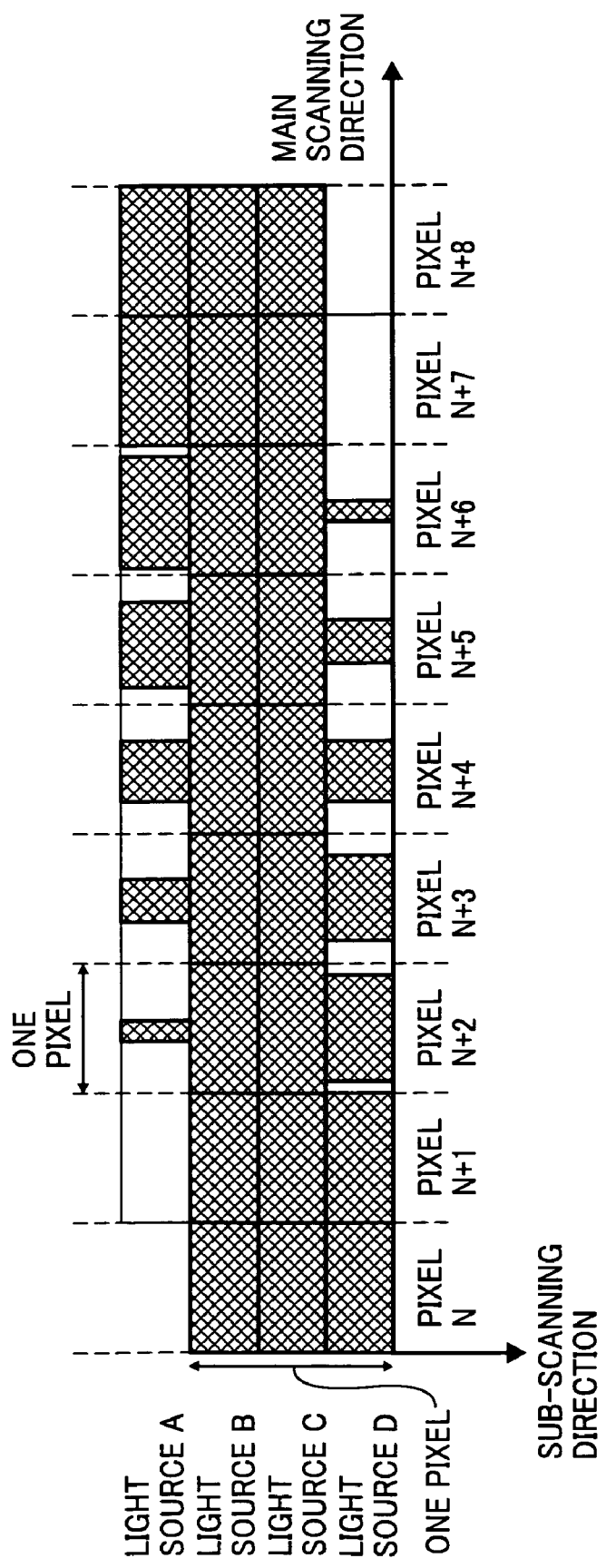

| IMAGE QUALITY ITEM | 1200dpi | 2400dpi |
|---|---|---|
| GRAININESS | ○ | ○ |
| TONE | ○ | ○ |
| SHARPNESS | ○ | ◎ |
| JAGGY | ○ | ◎ |

OPTICAL SCANNING DEVICE MOVING GRAVITY CENTER OF PIXEL IN SUB-SCANNING DIRECTION, IMAGE FORMING APPARATUS HAVING LIGHT SOURCES, AND METHOD

PRIORITY CLAIM

The present application is based on and claims priority from Japanese Patent Application No. 2006-292462, filed on Oct. 27, 2006, the disclosure of which is hereby incorporated by reference in its entirety.

BACKGROUND

The present invention relates to an optical scanning device having a plurality of light sources, an optical scanning method, a pixel forming device, an image forming apparatus using the optical scanning device having a plurality of light sources, and a color image forming apparatus using the same.

FIG. 29 illustrates an example of the structure of an image forming apparatus of a general type, such as a laser printer utilizing an electro-photography process, a digital copier, and so on. Referring to FIG. 29, laser beams emitted from a semiconductor laser unit 1001 acting as a light source unit are deflection-scanned with a rotating polygon mirror 1002 and irradiated onto a photosensitive member 1004 to be scanned through a scanning lens (fθ lens) 1003. The photosensitive member 1004 is exposed the laser beams and an electrostatic latent image is formed on the surface of the photosensitive member 1004. A phase synchronizing circuit 1009 forms an image clock (pixel clock) synchronizing with an output signal of a photodetector 1005 detecting the position of a scanning line and sends the image clock to an image processing unit 1006 and a laser driving circuit 1007. The image processing unit 1006 and the laser driving circuit 1007 are controlled in synchronization with the image clock, so as to control a light emitting time of the semiconductor laser beams. This control allows formation of the electrostatic latent image of the image data formed with the image processing unit 1006 at an appropriate position on the surface of the photosensitive member 1004.

Recently, there have been increasing demands for speeding-up a printing speed (i.e., forming an image at a high speed) and enhancing an image quality. In order to meet such demands, the speeding-up of the polygon motor working as a deflector and the image clock working as a reference clock for a laser modulation have been achieved. The efforts for speeding-up both of these means, however, have been approaching to the limits, and a further speeding-up of these means is being confronted with a severe situation.

Therefore, the speeding-up has been attempted by adopting multi-beams using plural light sources. An optical scanning method using multi-beams can decrease a rotating speed of the polygon motor working as the deflector and frequency of the image clock due to an increased number of light fluxes capable of being scanned simultaneously with the deflector, thereby achieving a high-speed and stable optical scanning and image forming.

As the light sources for emitting such multi-beams, there may be used a combination of plural laser chips of single beams, an LD array with plural light emitting diodes incorporated into a laser chip, and so on.

Since a semiconductor laser to be used for the LD array or the like is extremely compact in size and can be modulated directly with driving electric current at a high speed, it has recently been used widely as a light source for laser printers and so on. As the driving electric current and light output of the semiconductor laser have the characteristic of being varied with temperature, however, the semiconductor laser has the problem that the light output be varied with the heat emitted from the semiconductor laser itself. In particular, a vertical-cavity surface-emitting laser with plural light sources disposed on an identical chip is likely to be affected by a variation in temperature or temperature crosstalk, etc., by light emission or extinction because a distance between the light sources is short. This may likely cause changing a quantity of light.

In order to compete with this problem, for example, Japanese Patent Publication No. 2001-272615 discloses an optical scanning device with plural light sources disposed in a two-dimensional way for optically scanning a medium by deflecting plural light fluxes, in which a density of disposition of light emitting points is made maximum without causing an occurrence of any crosstalk by heat generation among the light emitting points.

Japanese Patent Publication No. 2003-72135 discloses an image forming apparatus using a vertical-cavity surface-emitting laser, which is provided with a driving part capable of varying a light emitting intensity of each chip at a pixel unit and a control part for controlling a light emitting time and forms an electrostatic latent image of pixels while avoiding a deterioration in the light emitting properties of the laser array caused by heat generation by controlling the light emitting time.

Japanese Patent Publication No. 2001-350111 discloses a multi-beam scanning device using a vertical-cavity surface-emitting laser, which can avoid the problem with crosstalk caused by heat generation among light emitting points by way of a defined arrangement of the light sources and realize the recording of images at a high density.

In general, conventional optical scanning devices having plural light sources as described above have the problem that a deviation in a light emitting level of each light source directly affects an adverse influence on a variation in brightness (or concentration) of pixels because one pixel is drawn by one light source. In particular, they have the problem that such a variation in brightness (or concentration) of pixels located in a sub-scanning direction which are discontinuous in terms of time cannot be corrected by such conventional systems. Further, they have the problem that there is no effective way for highly accurately correcting a deviation in position of the scanning line in the sub-scanning direction, which may be caused by optical or mechanical factors.

SUMMARY

It is, therefore, an object of the present invention to provide an optical scanning device having a plurality of light sources capable of correcting deviation in position in the sub-scanning direction of a scanning line resulting from an optical system factor and a mechanical factor with high accuracy, an optical scanning method, a pixel forming device, an image forming apparatus and a color image forming apparatus using the optical scanning device having a plurality of light sources.

To achieve the above object, a first aspect of the present invention involves an optical scanning device comprising n-odd (n≧2) light sources disposed at different positions at least in a sub-scanning direction, a pixel forming part in which one pixel is depicted by light beams emitted from m-odd (n≧m≧2) light sources of the n-odd light sources, and a distance of adjacent light sources for emitting the light beams in the sub-scanning direction is less than 5 μm, and a light source driving control part configured to control an emitting state of the light sources for depicting the one pixel and conduct an emission driving control for moving a gravity center of the one pixel in the sub-scanning direction.

A second aspect of the present invention involves an image forming apparatus comprising n-odd (n≧2) light sources disposed at different positions at least in a sub-scanning direction, wherein one pixel is depicted by light beams emitted from m-odd (n≧m≧2) light sources of the n-odd light sources and a distance of adjacent light sources for emitting the light bears in the sub-scanning direction is less than 5 μm.

A third aspect of the present invention involves an optical scanning method comprising the steps of preparing n-odd (n≧2) light sources disposed at different positions at least in a sub-scanning direction, depicting one pixel by light beams emitted from m-odd (n≧m≧2) light sources of the n-odd light sources, setting a distance of adjacent light sources for emitting the light beams in the sub-scanning direction to be less than 5 μm, controlling an emitting state of the light sources for depicting the one pixel, and conducting an emission driving control for moving a gravity center of the one pixel in the sub-scanning direction.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 10 is a schematic representation for explaining another example of the emission driving control of a light source driving control part.

FIG. 14 is a schematic diagram illustrating a specific example of the emission driving control according to a third embodiment of the present invention, wherein one pixel is formed in the sub-scanning direction with two light sources.

FIG. 15 is a schematic diagram illustrating a specific example of the emission driving control according to the third embodiment of the present invention, wherein one pixel is formed in the sub-scanning direction with one light source.

FIG. 16 is a schematic diagram illustrating a specific example of the emission driving control according to the third embodiment of the present invention, wherein one pixel is formed in the sub-scanning direction with three light sources.

FIG. 17 is a schematic diagram illustrating a specific example of the emission driving control according to the fourth embodiment of the present invention, wherein one pixel is formed in the sub-scanning direction by two light sources.

FIG. 18 is a schematic diagram illustrating a specific example of the emission driving control according to the fourth embodiment of the present invention, wherein one pixel is formed in the sub-scanning direction with three light sources.

DETAILED DESCRIPTION

Figure 1:
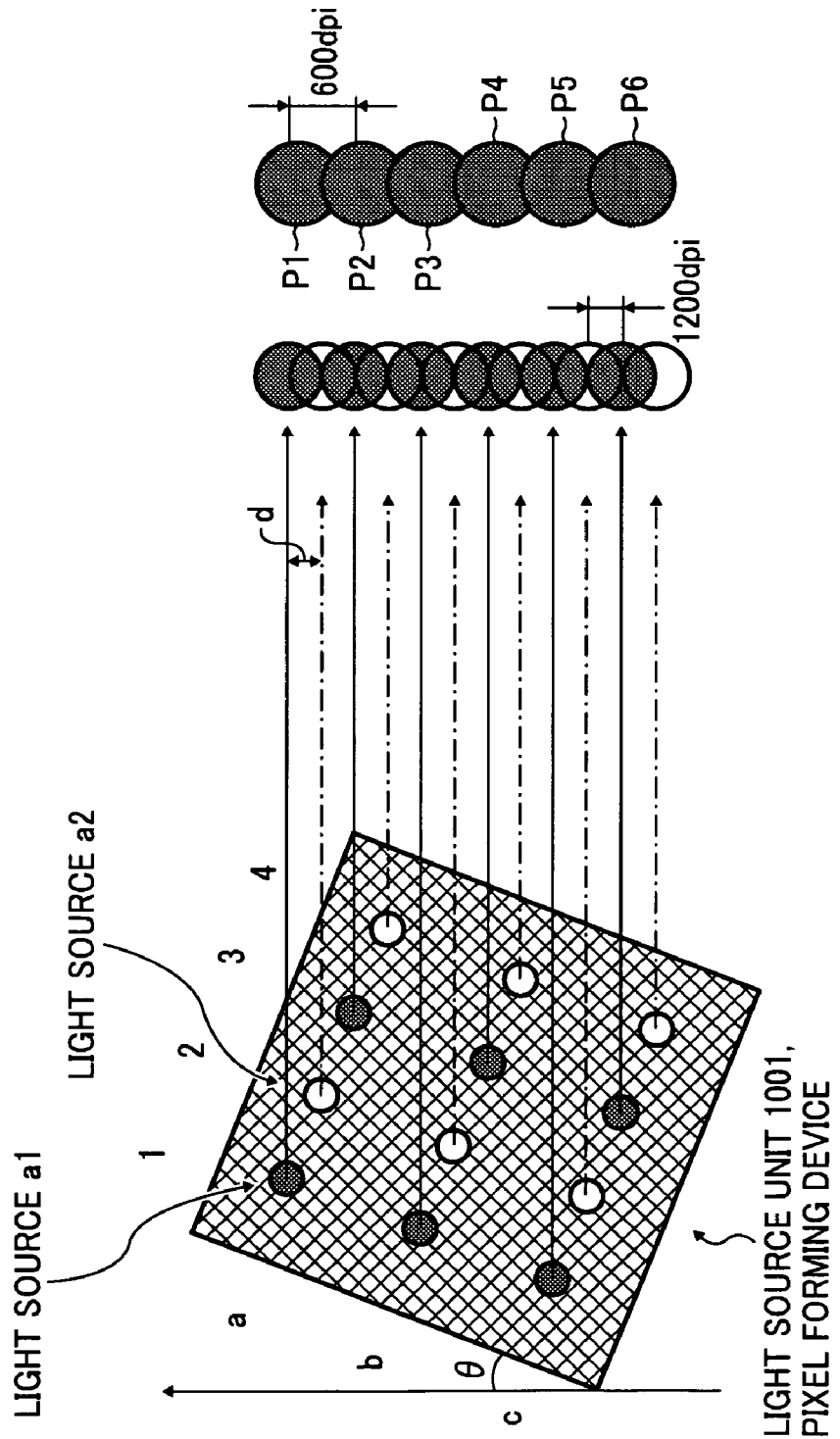
FIG. 1 illustrates a pixel forming device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

It is to be understood herein that one pixel is intended to genuinely mean one picture element (for example, a picture element of 1,200 dpi being a pixel of approximately 21 μm square). It is further noted herein that it is not intended to mean a pixel formed by synthesizing plural pixels (for example, 4×4 pixels), such as a dither matrix.

In accordance with the present embodiment of the invention, the terms "n-odd light sources disposed at least at different positions in the sub-scanning direction" are intended to mean the n-odd light sources disposed simply in a row in the sub-scanning direction as well as in a manner, for instance, as illustrated in FIG. 1.

First Embodiment

A first embodiment according to the present invention relates to a pixel forming device, wherein one pixel is formed by light beams emitted from m-odd light sources ($n \geq m \geq 2$) out of the n-odd light sources ($n \geq 2$) disposed at least at different positions in the sub-scanning direction.

The first embodiment of the present invention will be described in detail by way of the pixel forming device according to the first embodiment.

Figure 29:
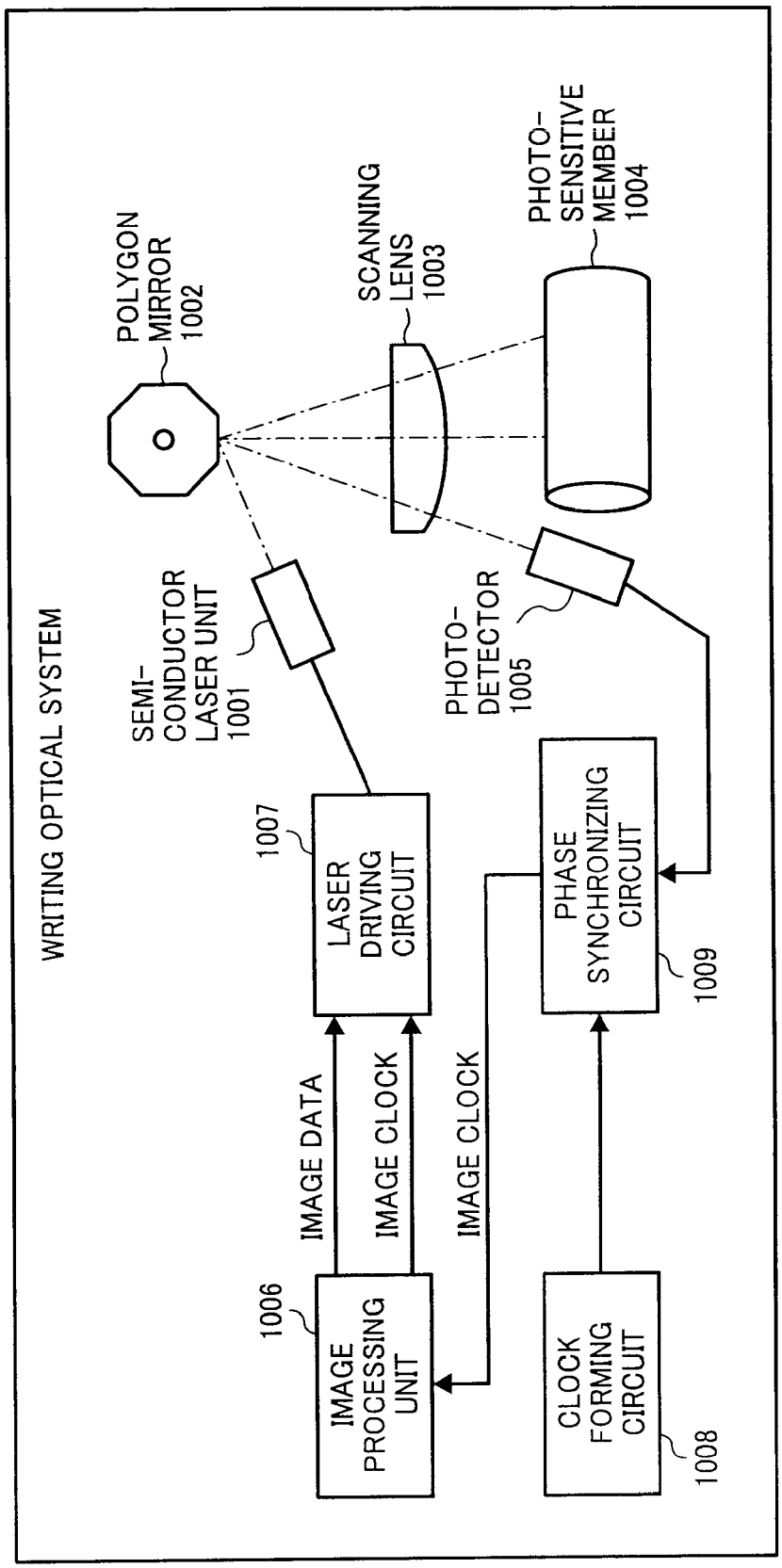
FIG. 29 is a diagram illustrating an example of the structure of a general image forming apparatus.

In the first embodiment of the present invention, the image forming apparatus of a general type as illustrated in FIG. 29 uses a light source unit 1001 illustrated in FIG. 1 as a pixel forming device. As illustrated in FIG. 1, the light source unit 1001 includes a semiconductor laser array in which plural light sources (plural semiconductor lasers) are disposed in a lattice-like arrangement or a surface emitting laser array in which plural light sources (vertical-cavity surface-emitting lasers: VCSEL) are disposed in a lattice-like arrangement on the same chip. In this arrangement, the light source unit 1001 is disposed in such a manner that the plural light sources are disposed in a direction at an angle θ with respect to the rotating axis of a deflector (a polygon mirror of FIG. 29).

In the first embodiment, as illustrated in FIG. 1, the light sources disposed in the longitudinal direction are provided, respectively, with symbols "a", "b" and "c", and the light sources disposed in the lateral direction are provided, respectively, with numerals 1 to 4, inclusive. For example, the light source at the upper left side of FIG. 1 is referred to as symbol "a1".

As the light source unit 1001 is disposed at angle θ, light source a1 and light source a2 expose different positions. A description will now be made regarding the case where one pixel is formed with two light sources. For example, in the case where two light sources a1 and a2 as well as two light sources a3 and a4 form each one pixel, as illustrated in FIG. 1, the light sources a1 to a4, inclusive, form pixels Pi (where i=1 to 6) as illustrated at the right end of FIG. 1.

In the event that, as illustrated in FIG. 1, the longitudinal direction in FIG. 1 is referred to as a sub-scanning direction and the distance between the centers of the adjacent pixels Pi is set to 600 dpi, the interval d of the centers of the two light sources forming one pixel is set to 1,200 dpi and the density of the light sources with respect to the density of the pixels is doubled. When one pixel is formed with two light sources, the position of gravity center of the pixel is possible to be deviated in the sub-scanning direction by changing a ratio of the quantity of light of the two light sources forming one pixel and the position of the pixel is possible to be controlled at high accuracy.

Second Embodiment

Figure 2:
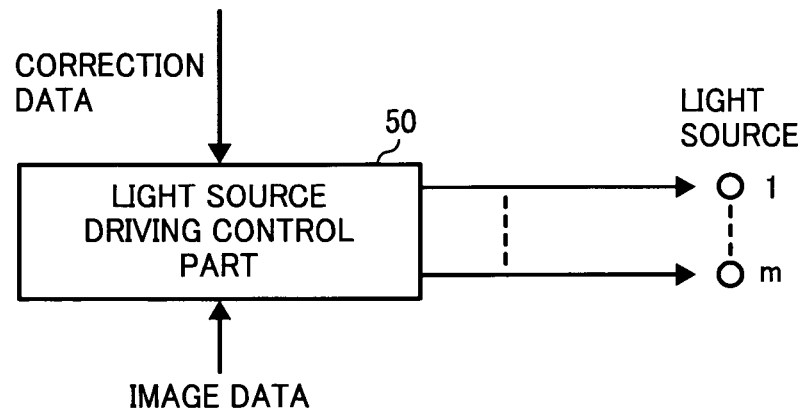
FIG. 2 illustrates an example of an optical scanning device according to a first embodiment of the present invention.

As illustrated in FIG. 2, the optical scanning device according to a second embodiment of the present invention is arranged in such a manner that one pixel is formed by light beams emitted from m-odd ($n \geq m \geq 2$) light sources out of n-odd ($n \geq 2$) light sources disposed at least at different positions in the sub-scanning direction. The optical scanning device is provided with a light source driving control part 50 for transferring the gravity center of one pixel in the sub-scanning direction by changing the driving states of the light sources in response to correction data for transferring the gravity center of the one pixel in the sub-scanning direction upon input of the correction data.

Figure 3:
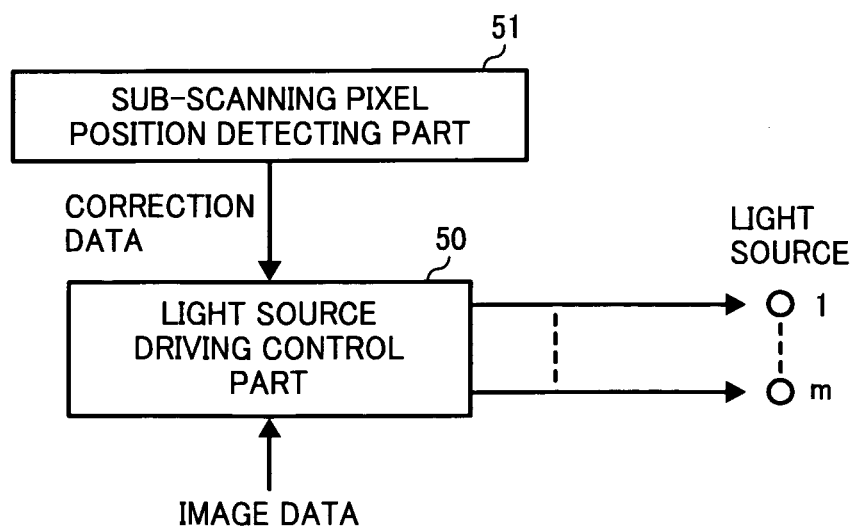
FIG. 3 illustrates an example of an optical scanning device according to the first embodiment of the present invention.

More specifically, as illustrated in FIG. 3, the optical scanning device according to the second embodiment is further provided with a pixel position detecting part 51 for detecting the position of a pixel in the sub-scanning direction and outputting the correction data for correcting the position of the pixel in the sub-scanning direction by detecting the pixel position in the sub-scanning direction. The light source driving control part 50 transfers the gravity center of one pixel in the sub-scanning direction by changing the driving states of the m-odd light sources in response to the correction data output from the pixel position detecting part 51.

It is to be noted herein that the technology as disclosed in Japanese Patent No. 3644923 for example can be applied to the pixel position detecting part 51 for detecting the positions of the pixels in the sub-scanning direction.

A color image forming apparatus as disclosed in Japanese Patent No. 3644923 is provided with plural image forming parts for forming images of colors different from one another on a recording medium by an electro-photographic system, the image forming parts being disposed along the transferring direction (i.e., the sub-scanning direction) of a transfer belt for transferring the recording medium; a toner mark forming part for forming a toner mark for detecting the position of each color and recording the toner mark on the transfer belt; at least three sensors for reading the toner marks, arranged at positions including the central portion and both end portions of the transfer belt extending in the primary scanning direction intersecting at right angle through the transfer direction of the transfer belt; and a position deviation amount detecting part for detecting an amount of deviation in the position of each color from a reference color position on the basis of the output of the sensors reading the toner marks. The position deviation amount detecting part can also be used as the pixel position detecting part 51 for detecting the positions of the pixels in the sub-scanning direction according to the embodiment of the present invention.

As described with the pixel forming device according to the first embodiment, the optical scanning device according to the second embodiment is arranged in such a manner that the light beams emitted from the m-odd (n≧m≧2) light sources out of the n-odd (n≧2) light sources disposed at least at different positions in the sub-scanning direction form one pixel. The manner of changing the driving states of the m-odd light sources may include, for example, a manner in which a ratio of light emitting time of each light source is changed to render a total light emitting time or a total exposure time of all the m-odd light sources constant or a ratio of light emitting level (or intensity) of each light source is changed to render a total exposure energy of all the m-odd light sources constant.

FIGS. 4 to 8 are schematic diagrams each for explaining a specific example of a manner for changing the driving states of the m-odd light sources with the light source driving control part 50.

Figure 4:
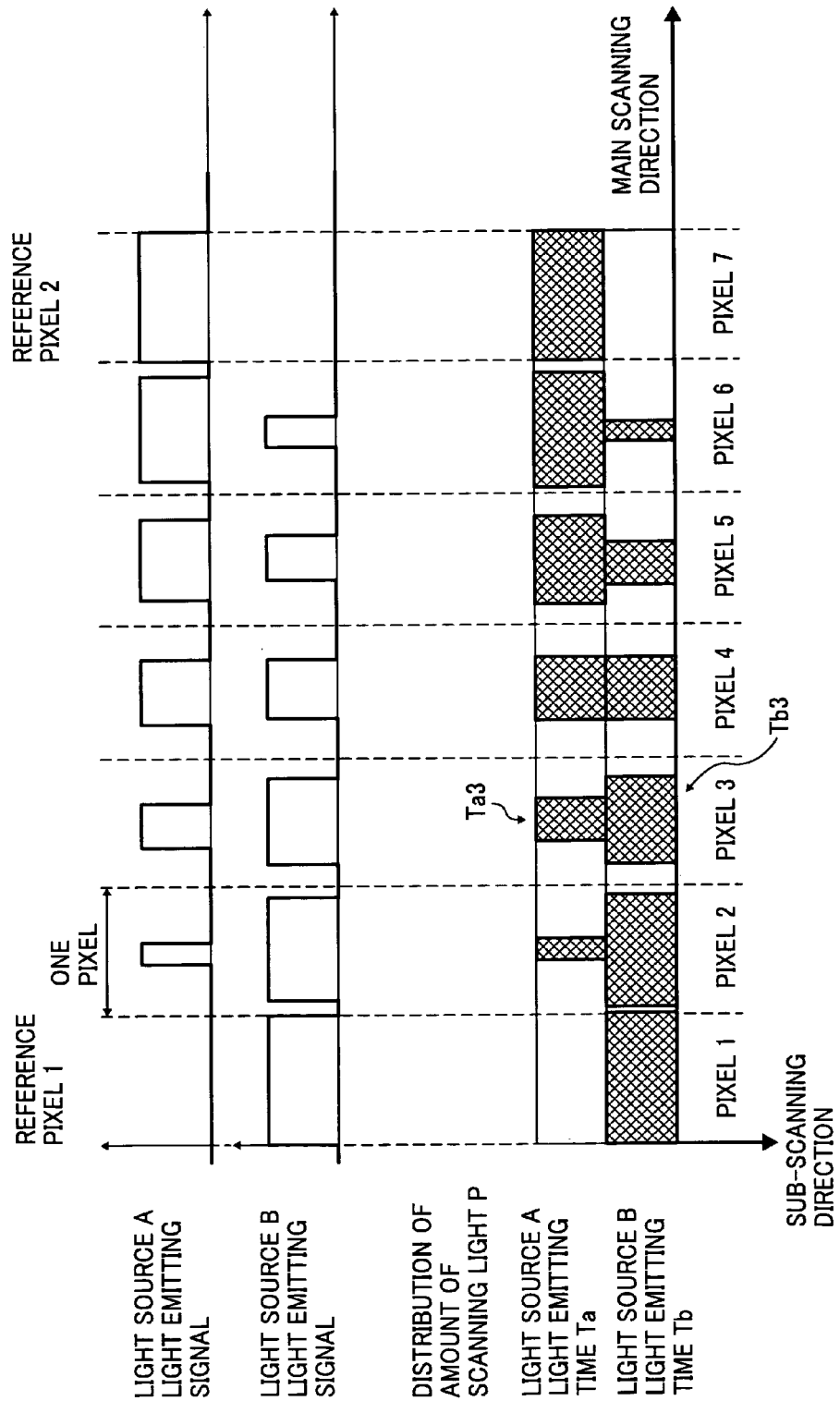
FIG. 4 is a schematic diagram illustrating a specific example of the emission driving control for changing the driving states of m-odd light sources according to a second embodiment of the present invention.

FIG. 4 is a schematic diagram describing a specific example in which a ratio of light emitting times of the m-odd light sources is changed to render a total light emitting time of all the m-odd light sources constant in order to transfer the gravity center of one pixel in the sub-scanning direction. FIG. 4 illustrates the example where light sources A and B form one pixel. In FIG. 4, light emitting signals of light sources A and B are illustrated on the upper side thereof and the light emitting times of light sources A and B are illustrated on the lower side thereof.

The case where the light sources a1 and a2 of FIG. 1 are referred to as light sources A and B of FIG. 4, respectively, is taken as an example for further explanation. As referred to in FIG. 4, only the light source B turns on for the pixel 1 and the light emitting time of the light source B is set to become gradually shorter as the pixels change from the pixel 1 to pixels 2, 3, . . . , while the light emitting time of light source A is set to become gradually longer. At pixel 4, the light emitting time of the light source A is set to become equal to that of the light source B. In the event that the pixel 4 is set as a reference pixel, the light emitting time of the light source A for the pixels 5, 6 and 7 become longer than that of the light source B, thereby deviating the gravity center of the pixels in an upward direction with respect to the sub-scanning direction as shown in FIG. 4. On the other hand, the light emitting time of the light source B for the pixels 1, 2 and 3 become longer than that of the light source A, thereby deviating the gravity center of the pixels in a downward direction with respect to the sub-scanning direction as illustrated in FIG. 4. The gravity center of the pixels is possible to be deviated in the sub-scanning direction by changing the ratios of light emitting times of the light sources to render a total light emitting time substantially constant in the manner as described above.

In the event where the pixel 3 is taken as an example by referring to the light emitting time of the light source A as Ta3 and the light emitting time of the light source B as Tb3, the light emitting signals are controlled to render the sum of the light emitting times (Tal1=Ta3+Tb3=Tan+Tbn (wherein n is a natural number)) constant. In this case, the deviation in the pixel position in the sub-scanning direction is possible to be corrected, for example, by using the technology as disclosed in Japanese Patent No. 3644923, that is, by detecting a deviation in position of a toner image in the sub-scanning direction with a sensor, calibrating correction data for correcting the deviation in the position, and changing the ratio of the light emitting time on the basis of the correction data.

Figure 5:
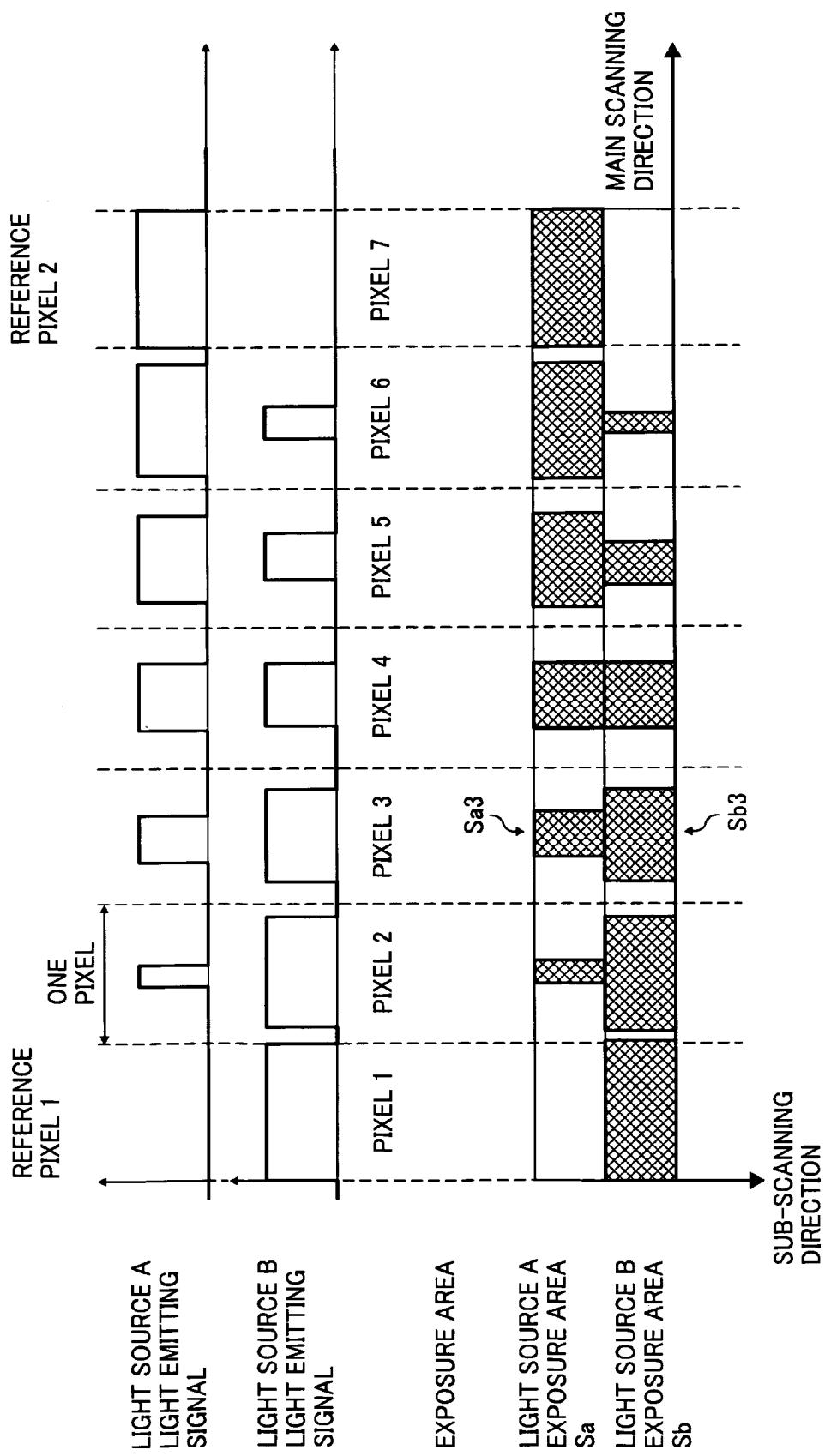
FIG. 5 is a schematic diagram illustrating another specific example of the emission driving control for changing the driving states of m-odd light sources according to the second embodiment of the present invention.

FIG. 5 illustrates a specific example where the ratios of light emitting times of the m-odd light sources are varied to render the total exposure area of the m-odd light sources in order to transfer the gravity center of one pixel in the sub-scanning direction. In FIG. 5, two light sources A and B are disposed to form one pixel. Light emitting signals of the light sources A and B are illustrated on the upper side of FIG. 5 and the light exposure areas of the light sources A and B are illustrated on the lower side of FIG. 5.

Exposure areas on a photosensitive member are varied on the basis of the light emitting signal from each of the light sources A and B. The case of pixel 3 is taken as an example by referring to the exposure area of the light source A as Sa3 and the exposure area of the light source B as Sb3. In this case, the light emitting signals are controlled to render the sum of the exposure areas (Sal1=Sa3+Sb3=San+Sbn (wherein n is a natural number)) constant. This control permits a deviation in gravity center of the exposure area (or gravity center of pixel) in the sub-scanning direction without changing the exposure area per pixel. Therefore, the deviation in position of the pixel in the sub-scanning direction is possible to be corrected by detecting the deviation of position of the toner image in the sub-scanning direction with a sensor, calculating correction data for correcting the deviation of the position of the pixel, and changing a ratio of the light emitting time (or a ratio of the exposure areas) based on the correction data.

Figure 6:
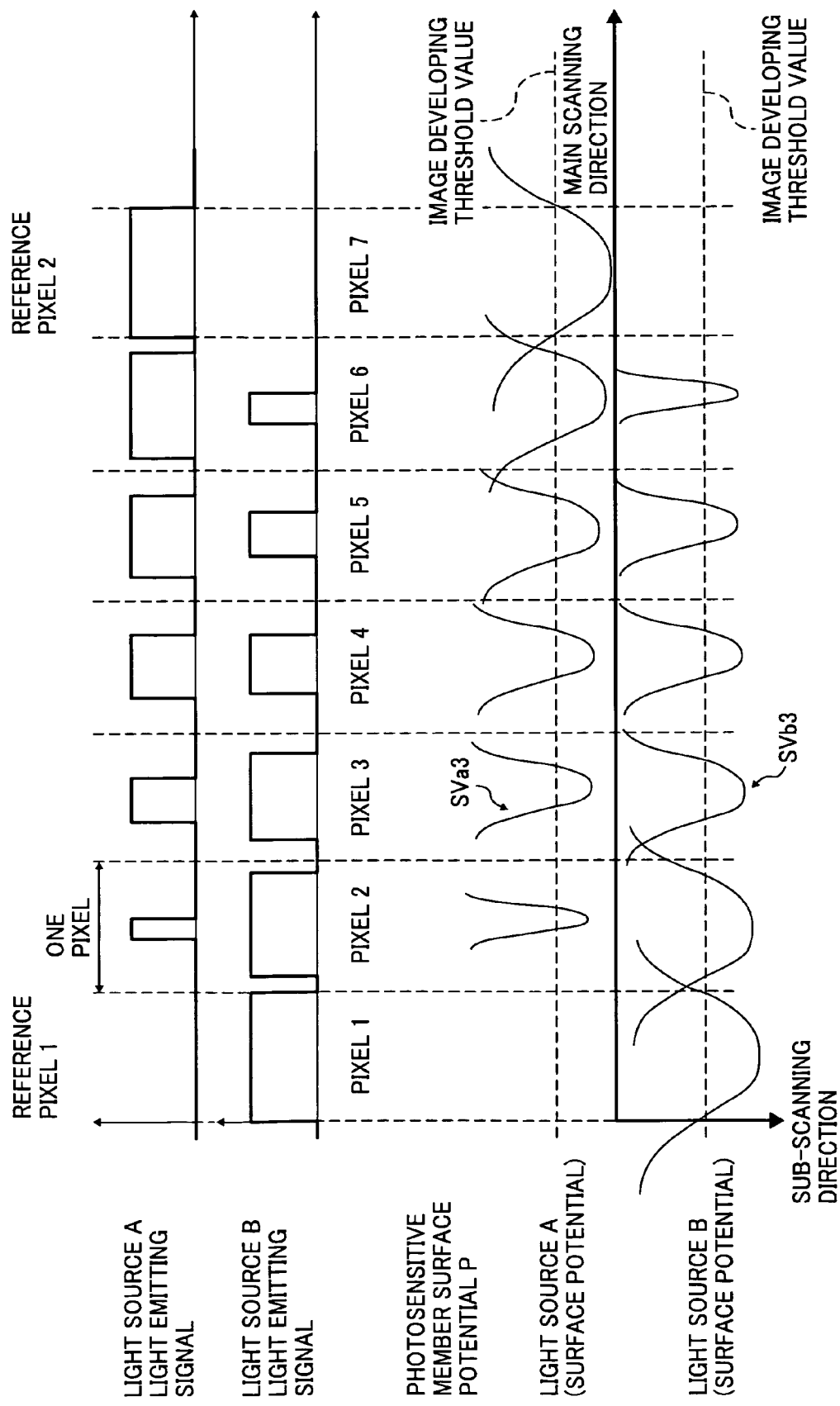
FIG. 6 is a schematic diagram illustrating another specific example of the emission driving control for changing the driving states of m-odd light sources according to the second embodiment of the present invention.

FIG. 6 illustrates a specific example in which a ratio of light emitting time of the m-odd light sources is changed to render a total surface potential on the surface of the photosensitive member with the m-odd light sources in order to transfer the gravity center of one pixel in the sub-scanning direction. In FIG. 6, the case where one pixel is formed by two light sources A and B is illustrated. Light emitting signals of the light sources A and B are illustrated on the upper side of FIG. 6 and the surface potentials of the light sources A and B are illustrated on the lower side of FIG. 6.

The pixel is formed on the photosensitive member when the light emitting time and the light emitting level of each of the light sources A and B are changed and when the surface potential exceeds a threshold of development in response to the light emitting time and the light emitting level. At this time, for example, the light emitting signals from the light sources A and 13 for pixel 3 are controlled to render the sum of a total surface potential of the surface potential SVa3 of the light source A and the surface potential SVb3 of the light source B (SVal1=SVa3+SVb3=SVan+SVbn (wherein n is a natural number)) constant. This control permits the gravity center of distribution of the surface potentials (or a gravity center of pixel) to deviate in the sub-scanning direction without changing the sum of the surface potentials per pixel. Therefore, the deviation in position of the pixel in the sub-scanning direction is possible to be corrected by detecting a deviation in position of the toner image in the sub-scanning direction with a sensor, calculating correction data for correcting the deviation in position of the pixel, and changing a ratio of the light emitting time (or a ratio of the surface potentials) on the basis of the correction data.

Figure 7:
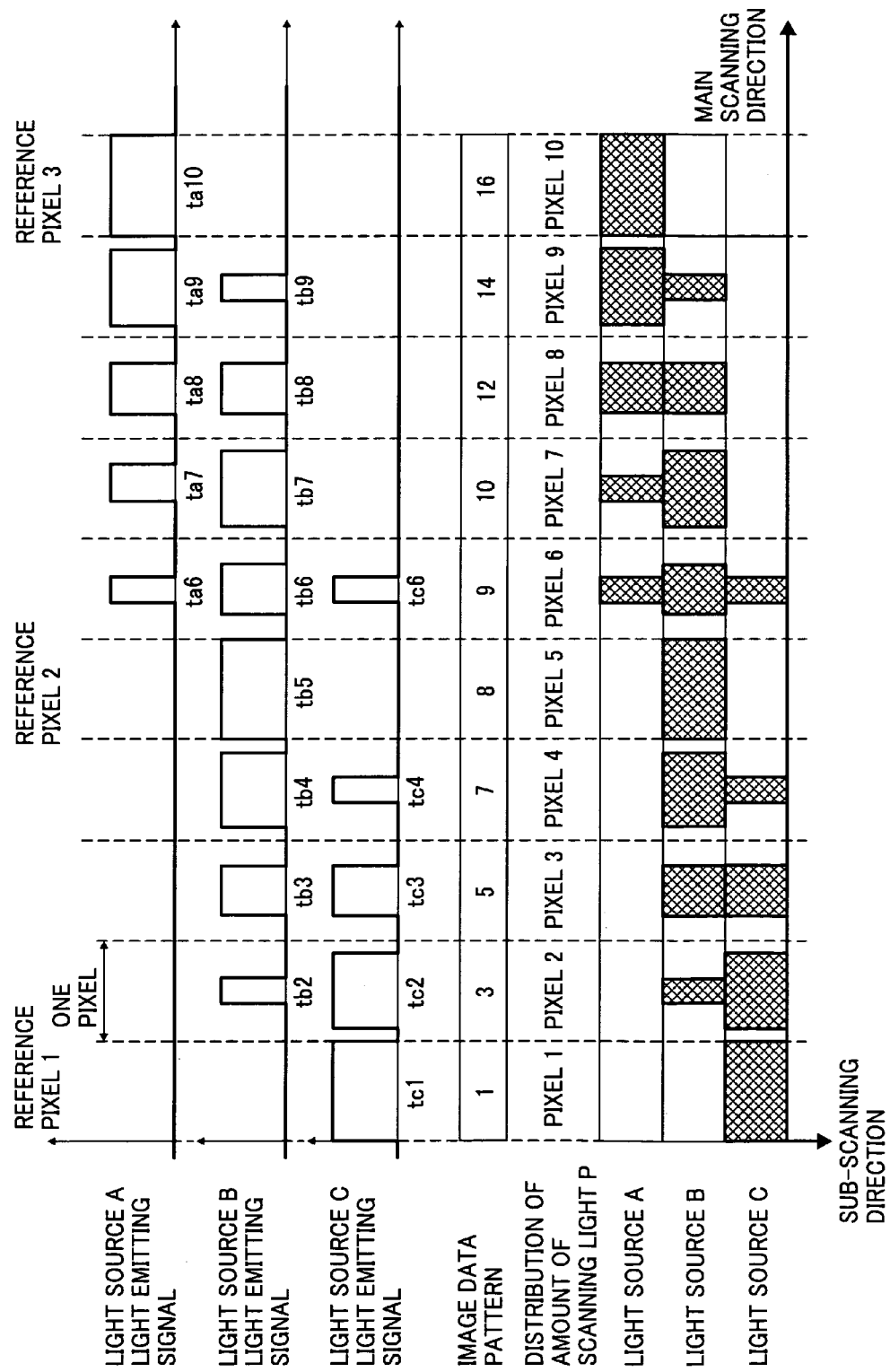
FIG. 7 is a schematic diagram illustrating another specific example of the emission driving control for changing the driving states of m-odd light sources according to the second embodiment of the present invention.

FIG. 7 illustrates an example where three light sources are used. As illustrated in FIG. 7, three light sources A, B and C are disposed to form one pixel, In the event where the position of the pixel would be deviated in the sub-scanning direction, a gravity center of the pixel is possible to be deviated in the sub-scanning direction by controlling the light emitting signals of the light sources A, B and C in substantially the same manner as the case where the two light sources are used. Therefore, the deviation in position of the pixel in the sub-scanning direction is possible to be corrected by detecting the position of the toner image in the sub-scanning direction with a sensor, calculating correction data for correcting the deviation in the image position, and changing a ratio of the light emitting time on the basis of the correction data.

Figure 8:
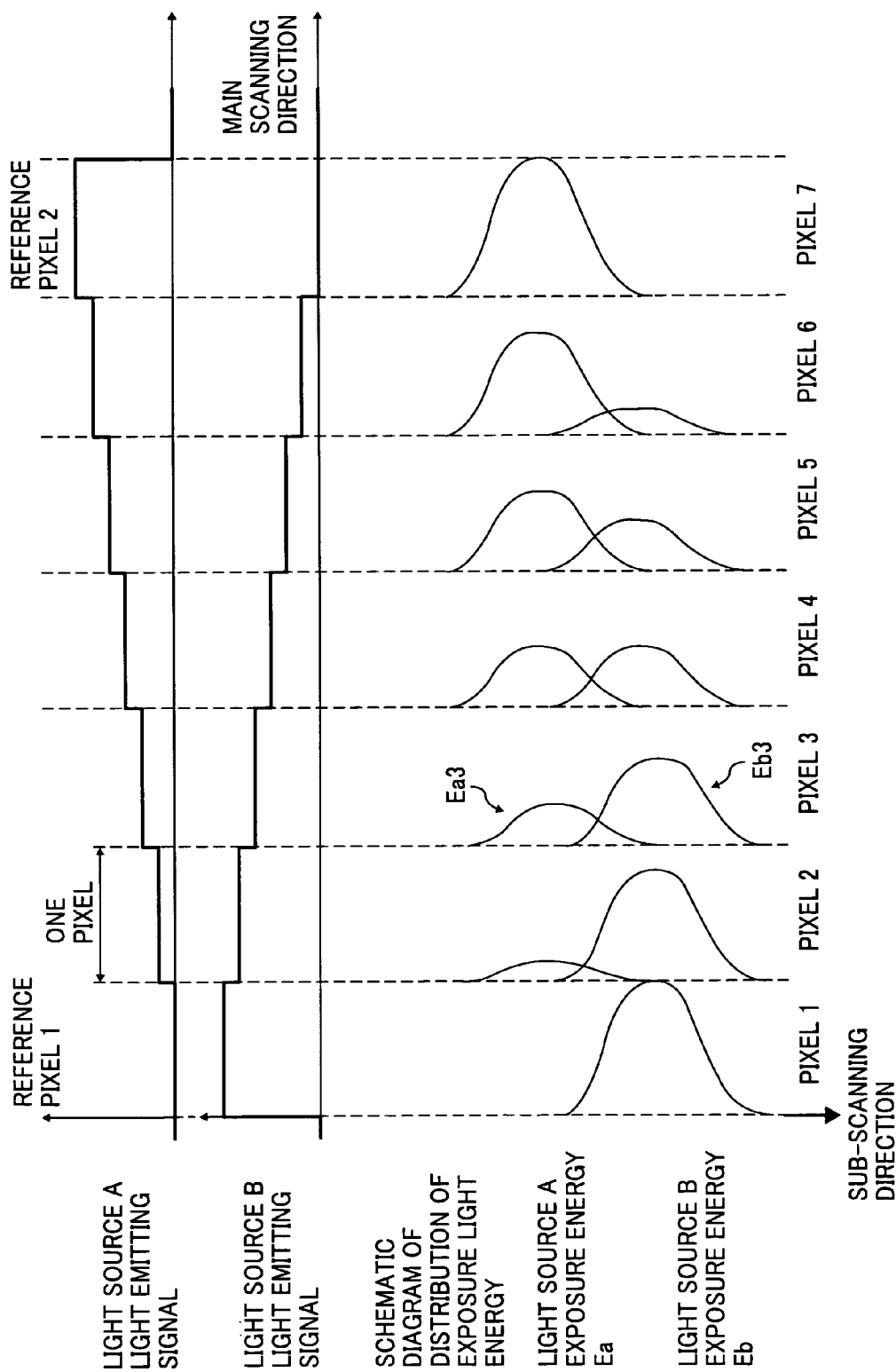
FIG. 8 is a schematic diagram illustrating another specific example of the emission driving control for changing the driving states of m-odd light sources according to the second embodiment of the present invention.

FIG. 8 illustrates a specific example in which a ratio of exposure energy of the m-odd light sources is varied to render a total exposure energy of the m-odd light sources constant in order to transfer the gravity center of one pixel in the sub-scanning direction. The light emitting signals of the light sources A and B are illustrated on the upper side of FIG. 8 and the exposure energy of the light emitting signals of the light sources A and B is illustrated on the lower side thereof.

The light emitting level (or exposure energy) of each of the light sources A and B is varied on the basis of light emitting signals from the light sources A and B. A case of pixel 3 is taken as an example by referring to the exposure energy of the light source A as Ea3 and the exposure energy of the light source B as Eb3. In this case, the light emitting signals are controlled to render the sum of the exposure energies (Ea11=Ea3+Eb3=Ean+Ebn (wherein n is a natural number)). This control permits a deviation in gravity center of the exposure energy (or gravity center of the pixel) in the sub-scanning direction without changing the exposure energy per pixel. Therefore, the deviation in position of the pixel in the sub-scanning direction is possible to be corrected by detecting a deviation in position of the toner image in the sub-scanning direction with a sensor, calculating correction data for correcting the deviation in the image position, and changing a ratio of the exposure energy (or the light emitting level) on the basis of the correction data.

Figure 9:
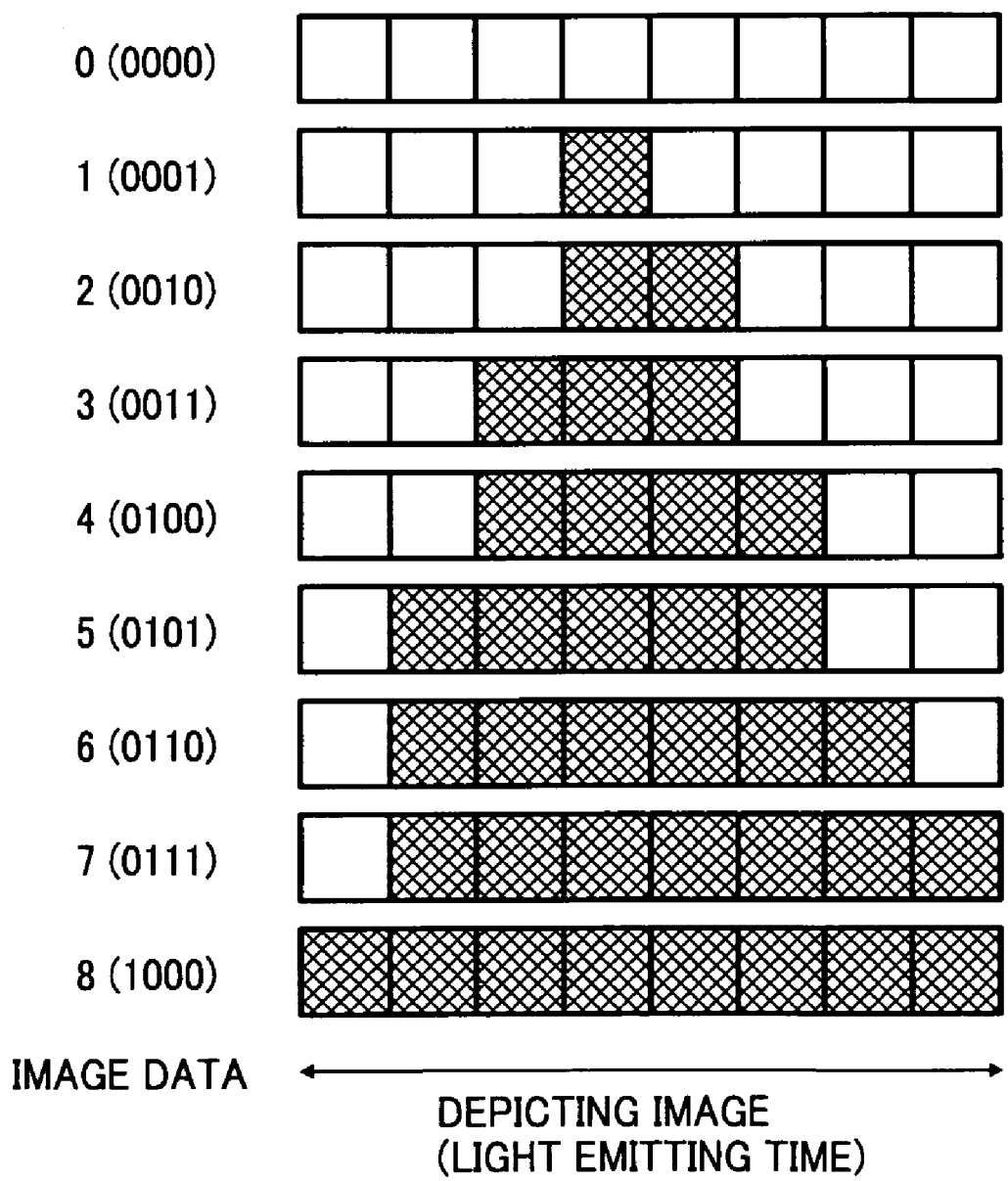
FIG. 9 is a schematic representation for explaining an example of the emission driving control of a light source driving control part.

FIGS. 9 and 10 illustrate each a specific example of control for varying the light emitting time of each of the light sources A and B, or an example of the control of the operation of the light source driving control part 50.

FIG. 9 illustrates the relationship of image data with a depicting image (or light emitting time). In FIG. 9, one pixel is depicted at a resolution of one eighth of the light emitting time (i.e., pixel width), required for depicting one pixel. Therefore, the image data is composed of eight kinds of image data including, for example, image data 1 corresponding to one eighth of the light emitting time, image data 2 corresponding to two eighths of the light emitting time, . . . , and image data 8 corresponding to eight eighths of the light emitting time. For example, image data 1 is the image data corresponding to the one eighth of the light emitting time that is required for forming an image by emitting light from the light source located at the eighth division of the light emitting time from the start of light emission if the light emitting time required for depicting one pixel is divided into eight divisions of the time. The image data 1 is represented by the four digits (0001) of the binary system. Likewise, for example, the image data 2 is the image data corresponding to the two eighths of the light emitting time and required for emitting the light source at the third and fourth divisions of the time from the start of light emission. The image data 2 is represented by the four digits (0010) of the binary system.

FIG. 10 illustrates a table indicating control patterns for controlling the light emitting times of the light sources A and B of FIG. 4 on the basis of the relationship of the image data with the depicting images (or light emitting times) as indicated by FIG. 9. The longitudinal axis of the table represents control patterns 1 to 7, inclusive, outputting to the light sources A and B, and the control patterns 1 to 7 correspond to pixels 1 to 7 of FIG. 4, respectively. For example, the control pattern 3 corresponds to the pixel 3 of FIG. 4 and depicts the pixel 3 by sending image data 3 (0011) to the light source A and image data 5 (0101) to the light source B.

Turning now to the light source driving control part 50, it selects a pattern 1 of FIG. 10 as the correction data (001) is given and likewise selects a pattern 2 of FIG. 10 as the correction data (010) is given. A pattern 3 of FIG. 10 is selected as the correction data (011) is given, and a pattern 4 of FIG. 10 is selected as the correction data (100) is given. Patterns 5, 6 and 7 of FIG. 10 are likewise selected as the correction data (101), (110) and (111) are given, respectively. When the correction data (001), (010), (011), (100), (101), (110) and (111) are given consecutively in this order, the light source driving control part 50 is possible to change the driving states of the light sources A and B in the manner as illustrated in FIG. 4.

By altering the control patterns of the light source driving control part 50, the light emitting times of the light sources A and B are possible to be controlled. Therefore, the position of gravity center of the pixel is possible to be deviated in the sub-scanning direction by altering the control pattern of the light source driving control part 50 in accordance with an amount of correction data for correcting the deviation in the pixel position.

Figure 11:
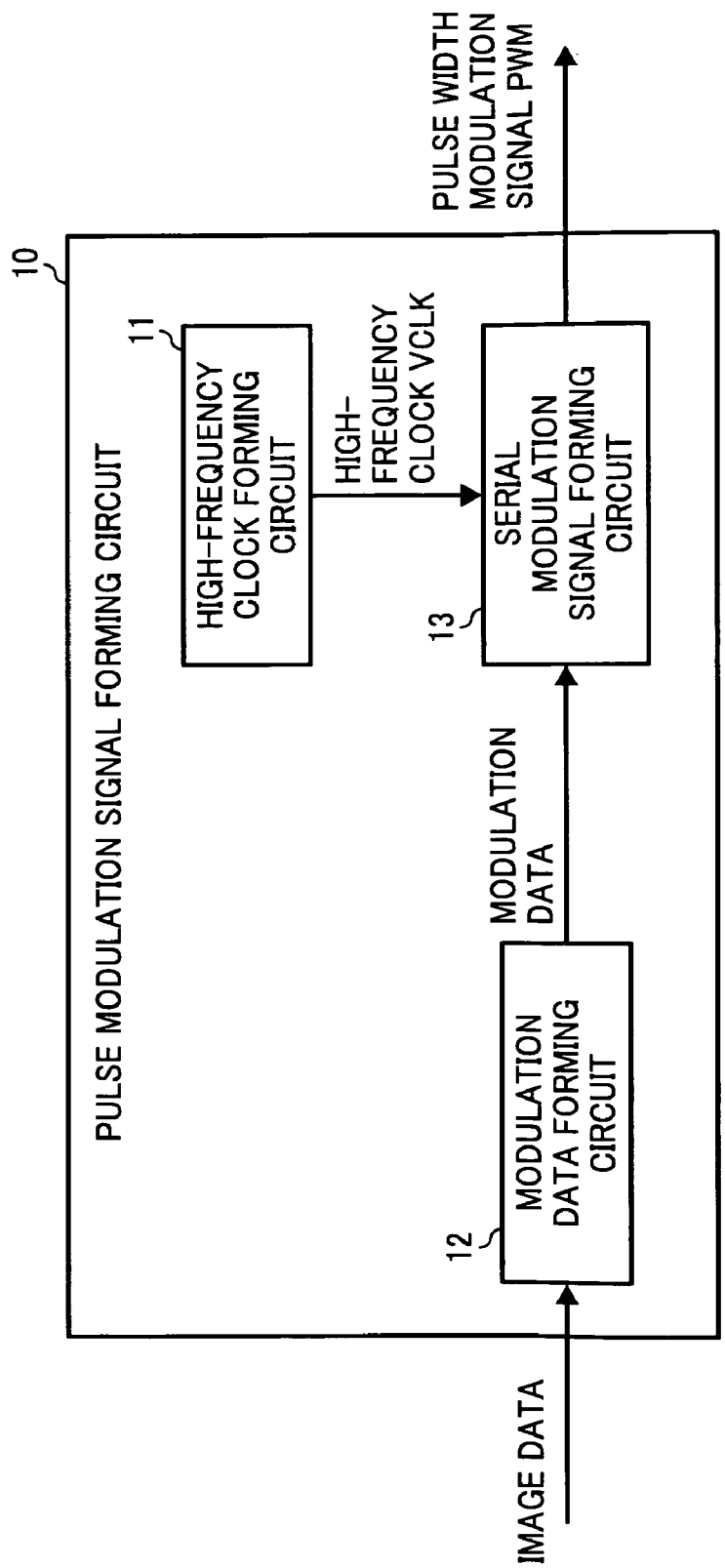
FIG. 11 is a diagram illustrating an example of the structure of a pulse modulation signal forming circuit.

Turning now to the image data as illustrated in FIG. 9, the image data is generally possible to be formed as a pulse width modulation signal PWM by using a pulse modulation signal forming circuit 10 as illustrated in FIG. 11. The pulse modulation signal forming circuit 10 of FIG. 11 includes a high-frequency clock forming circuit 11, a modulation data forming circuit 12, and a serial modulation signal forming circuit 13. The high-frequency clock forming circuit 11 forms a high-frequency clock VCLK remarkably faster than a pixel clock (i.e., a basic clock representing one pixel) that is generally required for an image forming apparatus. The modulation data forming circuit 12 forms modulation data representing a desired bit pattern (for example, (0011), etc.) on the basis of image data to be given from the outside such as an image processing unit, although not illustrated. The serial modulation signal forming circuit 13 outputs the pulse modulation signal PWM by receiving modulation data output from the modulation data forming circuit 12 and converting it to a serial pulse pattern string (i.e., a pulse train) on the basis of the high-frequency clock VCLK. It can be noted herein that the modulation data forming circuit 12 can be omitted if the modulation data from the outside could be given directly to the serial modulation signal forming circuit 13.

The greatest characteristic of the pulse modulation signal forming circuit 10 resides in that the serial modulation signal forming circuit 13 is possible to output the pulse modulation signal PWM by receiving the modulation data outputted from the modulation data forming circuit 12 and converting the modulation data to a serial pulse pattern string (or a pulse train) on the basis of the high-frequency clock VCLK. For the serial modulation signal forming circuit 13, there may be used a shift register.

Figure 12:
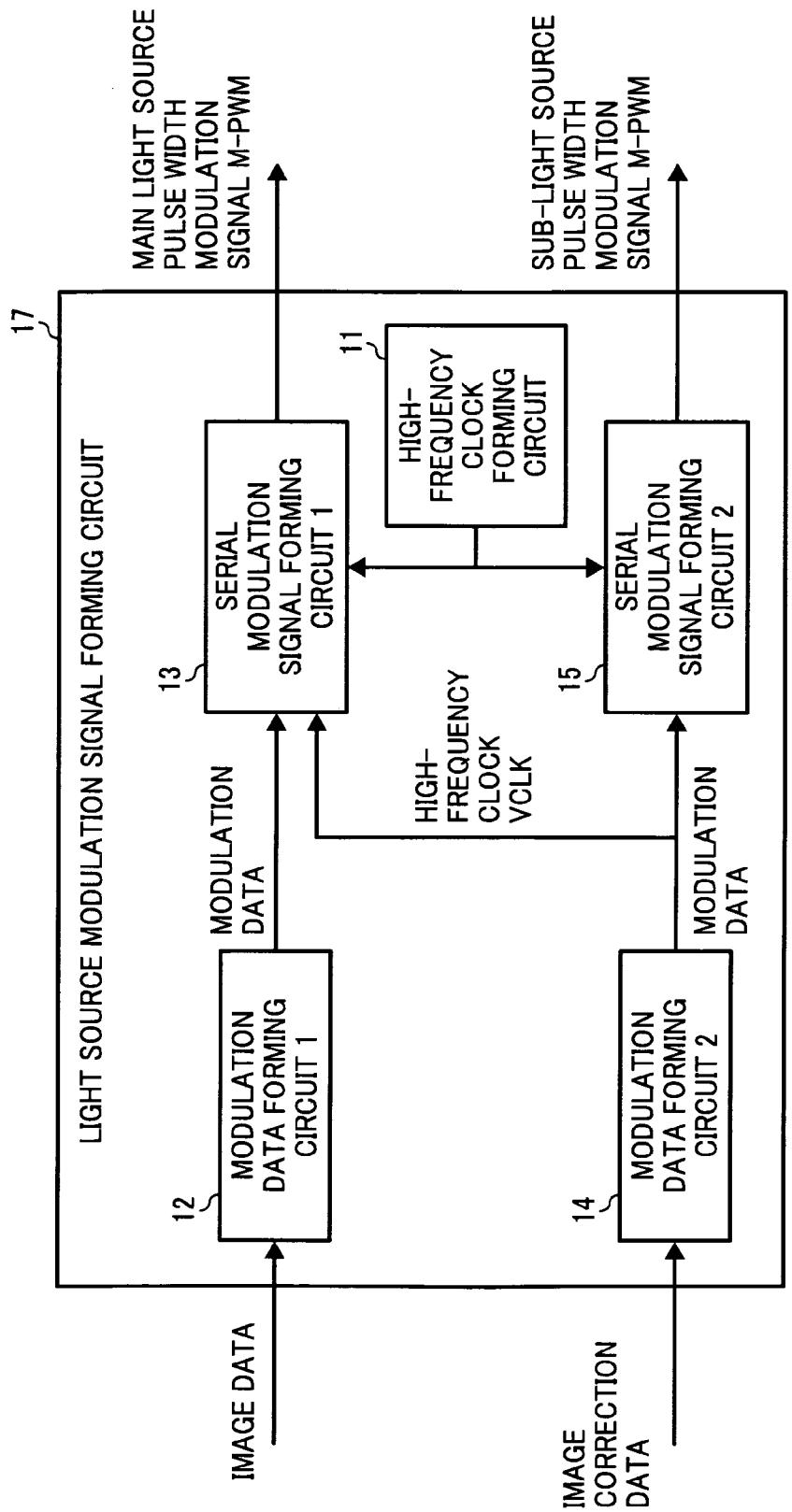
FIG. 12 is a diagram illustrating an example of the structure of a light source modulation signal forming circuit of the pulse modulation signal forming circuit of FIG. 11.

FIG. 12 illustrates a light source modulation signal forming circuit 17 for controlling light emission of the light source by forming the image data of FIG. 9 with the pulse modulation signal forming circuit 10 of FIG. 11 and using the control patterns of FIG. 10 which are combinations of the image data.

The light source modulation signal forming circuit 17 of FIG. 12 controls the light sources A and B by using the image data and the correction data as control data. The image data as used herein may include, for example, scanner image data for copiers and data upon printing. The correction data as used herein may include, for example, data for correcting the position of pixel in the sub-scanning direction with respect to the image data, such as correction data for correcting a pixel position in the sub-scanning direction to be outputted from the sub-scanning pixel position detecting part 51 for detecting the position of the pixel in the sub-scanning direction as described above.

For the light source modulation signal forming circuit 17 as illustrated in FIG. 12, the image data is converted to modulation data with the modulation data forming circuit 1 (12) and given to the serial modulation signal forming circuit 1 (13). Likewise, the correction data is converted into the modulation data with the modulation data forming circuit 2 (14) and inputted into the serial modulation signal forming circuits 1, 2 (13, 15), respectively, which in turn output pulse width modulation signals (i.e., main light source pulse width modulation signal M-PWM and sub light source pulse width modulation signal S-PWM) on the basis of the modulation data from the modulation data forming circuit 1, 2 (12, 14) and the high-frequency clock VCLK to be outputted from the high-frequency clock forming circuit 11. This relationship between the input and the output is illustrated in FIG. 9 as an image diagram. As illustrated in FIG. 9, the pulse modulation signal for depicting the pattern image as illustrated therein is outputted on the basis of 4-bit image data. The main light source pulse width modulation signal M-PWM is possible to be used as a driving control signal for the light source B and the sub-light source pulse width modulation signal S-PWM is possible to be used as a driving control signal for the light source A.

In this case, each of seven kinds of control patterns as illustrated in FIG. 10 is possible to be selected as a control pattern for the correction data in this embodiment, the light emitting time required for depicting the image pattern (or a one-pixel width) corresponding to the image data 8 (1000) is set as a reference light emitting time. In each of the control patterns as illustrated in FIG. 10, each image data of the light sources A and 13 is set to render the sum of the light emitting times of FIG. 9 corresponding to each image data of the light sources A and 13 equal to the reference light emitting time. As illustrated in FIG. 10, a lookup table (LUT) representing the relationship between the control pattern and the image data is provided and the control pattern is selected from seven kinds of the control patterns on the basis of the correction data, thereby permitting a correction of the deviation in position of the pixel in the sub-scanning direction. For example, when the correction data is represented by (000), the pattern 1 of FIG. 10 is selected to control the driving of the light sources A and B by the image data (light emitting times) 0, 8 of FIG. 9, respectively. When the correction data is represented by (011), the pattern 3 of FIG. 10 is selected to control the driving of the light sources A and B by the image data (light emitting times) 3, 5 of FIG. 9, respectively.

By using the light source modulation signal forming circuit 17 of FIG. 12 for the light source driving control part 50, the driving states of the two light sources A and B are possible to be varied in the manner as described in FIG. 4.

In the above embodiment, the description has been made regarding a specific circuit configuration in the case of the control of driving the light sources as illustrated in FIG. 4. In the event where the driving of the light sources is controlled in the manner as described in FIG. 8, a power modulation signal forming circuit 18 as illustrated in FIG. 13 may be used as a basic circuit configuration in place of the pulse modulation signal forming circuit 10 of FIG. 11.

Figure 13:
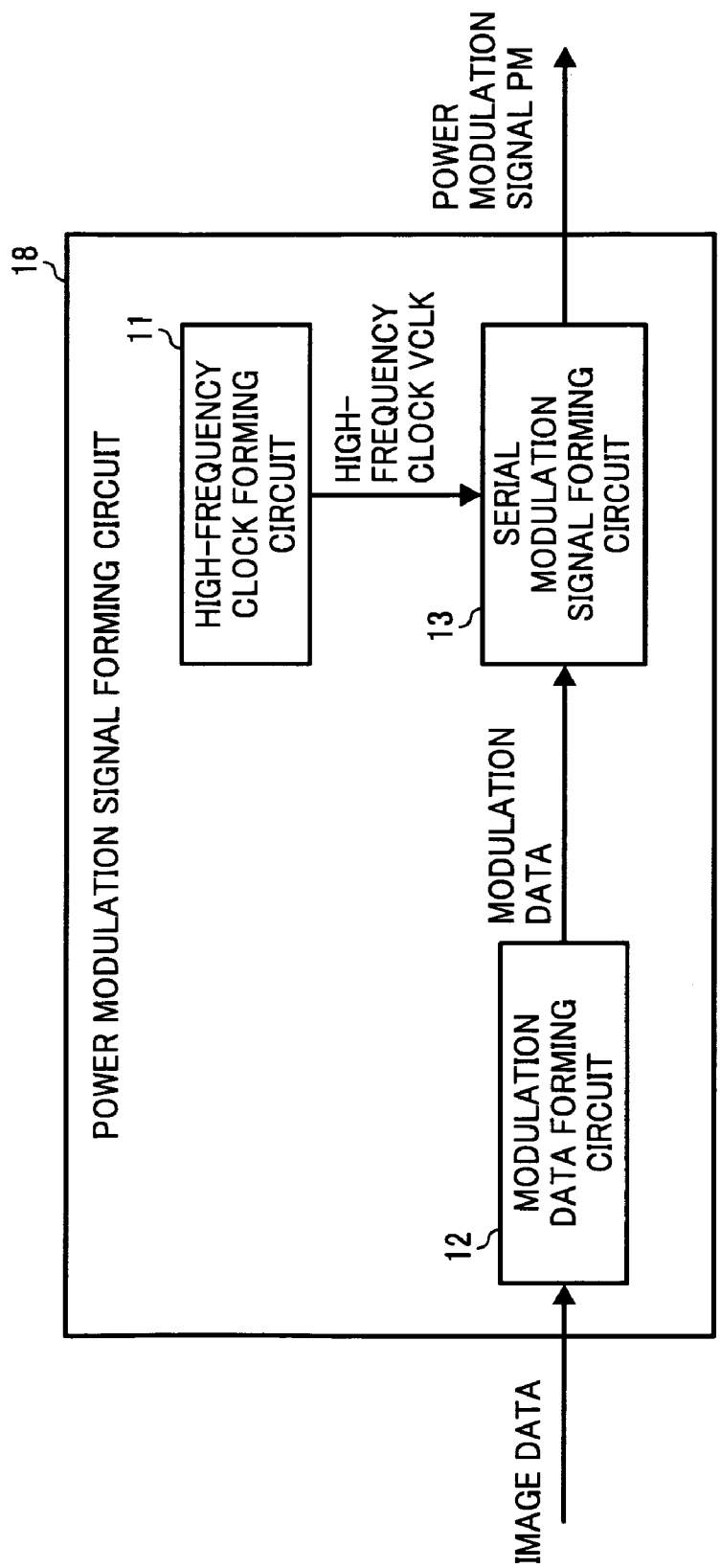
FIG. 13 is a diagram illustrating an example of the structure of a power modulation signal forming circuit.

In the power modulation signal forming circuit 18 of FIG. 13, the image data to be inputted to the modulation data forming circuit 12 indicates an amount of light emission (or intensity) of each light source. The modulation data forming circuit 12 receives the image data and outputs the modulation data representing the light emitting intensity. On the other hand, the serial modulation signal forming circuit 13 outputs serially the power modulation signal PM corresponding to the light emitting intensity representing the modulation data on the basis of the modulation data to be outputted from the modulation data forming circuit 12 and a high-frequency clock VCLK far faster than the image clock to be formed with the high-frequency forming circuit 11.

By applying the power modulation signal forming circuit 18 of FIG. 13 to the light source modulation signal forming circuit 17 of FIG. 12, the driving of the light sources is possible to be controlled in the manner as illustrated in FIG. 8.

In the case where the number of the light sources whose driving is to be controlled is three or more (for example, in the case where the driving control of the light sources is performed in the manner as illustrated in FIG. 7), a circuit configuration extended to the circuit configuration of FIG. 12 may be used.

In accordance with the embodiment of the present invention, various embodiments of driving the light sources are possible to be controlled in addition to the embodiments of driving the light sources in the manner as described above.

Third Embodiment

The optical scanning device according to a third embodiment of the present invention is configured basically in substantially the same manner as illustrated in FIG. 2 or FIG. 3, and forms one pixel with the light beams emitted from the m-odd light sources (n≧m≧2) out of the n-odd light sources (n≧2) disposed at least at different positions in the sub-scanning direction. In the event where the deviation in position of the scanning line is corrected in this embodiment, an amount of shifting upon correction of the sub-scanning direction is set to become equal to a distance between the adjacent light sources (as referred to as d in FIG. 1) in the sub-scanning direction in order to shift the light sources depicting the pixel in the sub-scanning direction.

The manner of controlling the driving of the light sources according to the third embodiment is applied to a case where the pixel is a two-dimensional image of a general type except a line image and all pixels represent image data (i.e., a case where there is no "0" pixel).

FIG. 14 illustrates a specific example of controlling the driving of the light sources according to the third embodiment. In this embodiment, there is illustrated a case where a line having an equal height of one pixel is depicted in the main-scanning direction (from the left side to the right side). This line is deviated by one pixel downwardly under the sub-scanning direction between from pixel N+5 to pixel N+8 of FIG. 14 due to a deviation resulting from an optical or mechanical factor. In order to correct the deviation in position of the pixel in this case, the pixel to be depicted may be shifted by one pixel upwardly from the sub-scanning direction (i.e., upwards in FIG. 14). In other words, a pixel may be depicted upon transferring to the pixel N+5 by the light sources A and B. An amount of shifting for correction in this case is made equal to the distance between the adjacent light sources (as referred to as d of FIG. 1) in the sub-scanning direction. The correction of the position in the reverse direction is also possible to be made in the same manner as described above.

FIG. 15 illustrates an example of correcting a deviation in position of a line upon depicting the line as high as one pixel in the main-scanning direction (i.e., from the left side to the right side) with one light source. This example illustrates a case where a line having a height equal to the height of one pixel is depicted in the main-scanning direction with the light source B and the pixels are deviated downwardly in the sub-scanning direction by one pixel between pixel N+5 and pixel N+8 of FIG. 15. In order to correct the deviation in position of the pixel in this case, the light source depicting the pixels N+5 et seq may be shifted from the light source B to the light source A and the pixels to be depicted may be shifted each by one pixel in the sub-scanning direction (i.e., upwardly in FIG. 15). By shifting the light source in the sub-scanning direction in the manner as described above, the deviation in position of the scanning line in the sub-scanning direction is possible to be corrected. An accuracy of correction in this case is determined by a distance between the pixels. In the event where one pixel is depicted, for example, at 600 dpi, an accuracy of correction of the deviation in position of the scanning line may be 600 dpi≈42.5 μm. However, the deviation is recognized visually by the human's eyes with this accuracy.

On the other hand, in the event where a density of pixels is made considerably finer, for example, as small as a pitch of 2,400 dpi and 4,800 dpi, an accuracy of correction becomes approximately 10 μm and 5 μm, respectively, thereby making it unlikely to be recognized by human's eyes. The density of pixels at 4,800 dpi or higher is practically unnecessary as an over-quality from the point of view of depicting the image and it cannot be said to be an optimal choice because an amount of data becomes too voluminous.

The example as illustrated in FIG. 15 has the drawbacks as described above. On the other hand, in the case where the driving of the light sources for depicting one pixel with plural light sources is controlled as in the example as illustrated in FIG. 14, the image data of 600 dpi or 1,200 dpi is considered to be appropriate for the light sources for depicting the pixels, even if they have a resolution of, for example, 2,400 dpi or 4,800 dpi. In other words, if a resolution of the light source is different from a resolution of the pixel and the former is larger than the latter, the resolution of the pixel is possible to ensure its necessity and adequacy and the correction of the deviation in position of the scanning line is possible to be made in a finer fashion at this resolution of the light source.

As described above, the third embodiment is possible to correct the deviation in position of the scanning line caused by optical or mechanical factors in general images except line images.

FIG. 16 illustrates a specific example of the light source driving control in a case where one pixel is formed with three light sources A, B and C in accordance with the third embodiment. The light source driving control illustrated in FIG. 16 is also possible to correct the deviation in position of the scanning line caused by optical or mechanical factors in general images except line images.

Fourth Embodiment

The optical scanning device according to a fourth embodiment of the present invention has basically a configuration substantially similar to the configuration as illustrated in FIG. 2 or FIG. 3 and, as a first control pattern, forms one pixel with light beams emitted from m-odd (n≧m≧2) light sources out of n-odd light sources (n≧2) disposed at least at different positions in the sub-scanning direction after the start of depicting the pixels. Then, one pixel is formed with light beams emitted from (m+1)-odd light sources from a certain position in the main-scanning direction. Further, thereafter, one pixel is again formed with the light beams emitted from the m-odd light sources from a certain position in the main-scanning direction. Upon correcting a deviation in position of the scanning line in this example, an amount of shifting the light sources in the sub-scanning direction is set to be equal to a distance between the adjacent light sources (as referred to as d of FIG. 1) in the sub-scanning direction in order to shift the light sources depicting the pixels in the sub-scanning direction. Therefore, the light sources for use in depicting the pixels are shifted by one light source toward the sub-scanning direction as compared with before the start and after the end of depicting the pixels.

Alternatively, as a second control pattern, one pixel is formed with light beams emitted from m-odd (n≧m≧2) light sources out of n-odd (n≧2) light sources disposed at least at different positions in the sub-scanning direction after the start of depicting the pixels and, thereafter, one pixel is formed with the light beams emitted from the (m+1)-odd light sources from a certain position in the main-scanning direction.

In the first or second control pattern, the light source driving control part 50 renders smoothing processing for smoothing edges of pixels by stepwise changing the driving state of the light source among the (m+1)-odd light sources located at least at one end in the sub-scanning direction during a period when one pixel is depicted with the (m+1)-odd light sources.

For the smoothing processing, there may be used PWM (pulse width modulation) or PM (power modulation) or a combination of PWM and PM.

The manner of controlling the driving of the light sources according to the fourth embodiment is possible to be applied to a case where the image is a line image and is provided with a meaningless pixel (i.e., pixel 0) outside the line image.

FIG. 17 illustrates a specific example of the light source driving control according to the fourth embodiment (or an example of the first control pattern according to the fourth embodiment). In the example as illustrated in FIG. 17, one pixel is formed with two light sources B and C at the initial stage as in the example of FIG. 14. In the example of FIG. 17, however, the pixels are smoothly moved by rendering a pulse width modulation in association with the light sources C and A without shifting the light source from the light source C to the light source A suddenly at pixel N+5 as in the example of FIG. 14. By this manner, the pixels can be moved with a resolution smaller than the distance of the light sources. In the example of FIG. 17 where, for example, the pulse width is set to 12, smoother pixel movement is possible to be made upon the correction of a deviation in position of the scanning line by setting the pixels in such a manner as will be described hereinafter:

Pixel N+1 and beforehand, Light source C: PWM value 12; Light source A: PWM value 0
Pixel N+2: Light source C: PWM value 10; Light source A: PWM value 2
Pixel N+3: Light source C: PWM value 8; Light source A: PWM value 4
Pixel N+4: Light source C: PWM value 6; Light source A: PWM value 6
Pixel N+5: Light source C: PWM value 4; Light source A: PWM value 8
Pixel N+6: Light source C: PWM value 2; Light source A: PWM value 10
Pixel N+7: Light source C: PWM value 0; Light source A: PWM value 12

("PWM value 0" means no light emission.)

In other words, in the example as illustrated in FIG. 17, the pixels can be smoothly moved by stepwise changing the driving states of the light sources disposed at both ends among the (m+1)-odd light sources (in this example, three light sources).

FIG. 18 illustrates a specific example illustrating the light source driving control according to the fourth embodiment in which one pixel is formed with three light sources A, B and C as in the example of the first control pattern in the fourth embodiment. The example as illustrated in FIG. 18 is possible to smoothly move the pixels by stepwise changing the driving states of the light sources disposed at both ends among the (m+1)-odd light sources (in this example, three light sources), as in the example as illustrated in FIG. 17.

Figure 19:
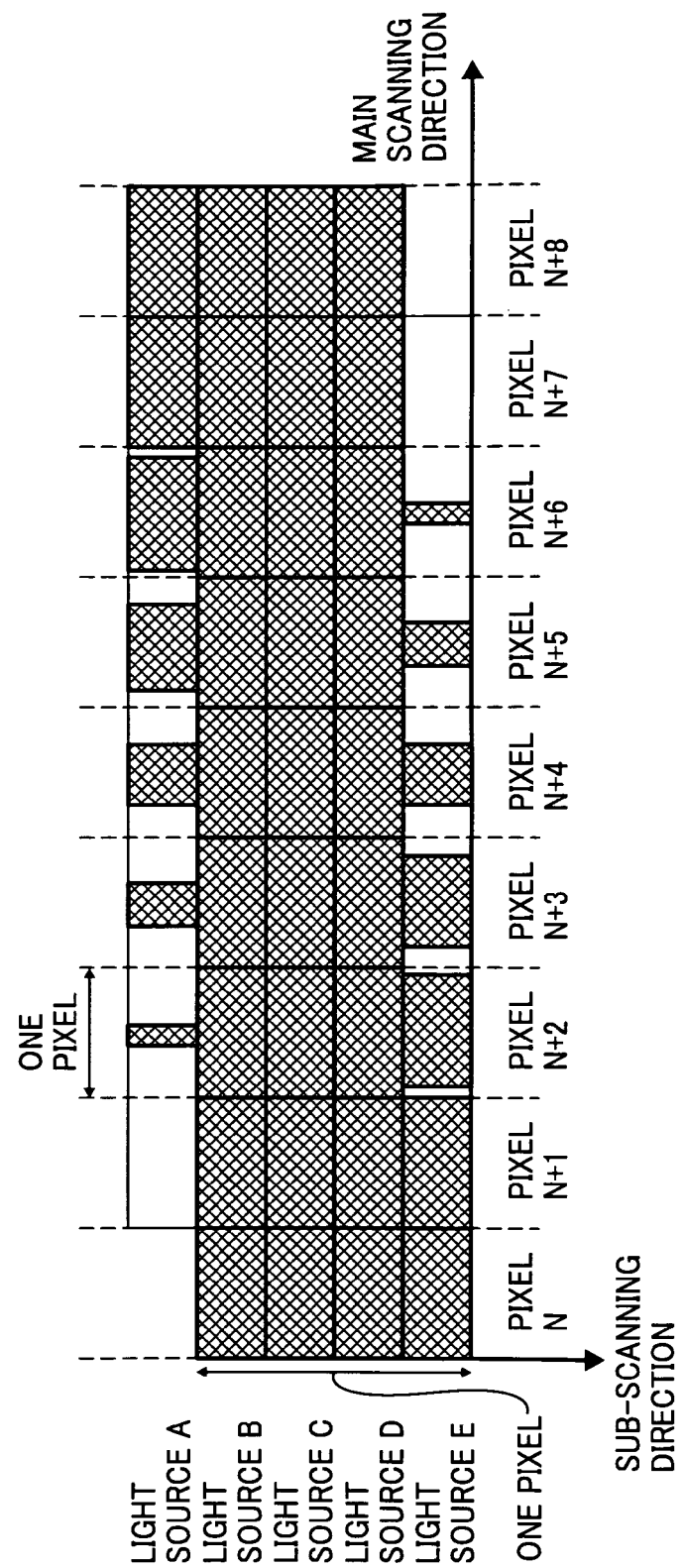
FIG. 19 is a schematic diagram illustrating a specific example of the emission driving control according to the fourth embodiment of the present invention, wherein one pixel is formed in the sub-scanning direction with four light sources.

FIG. 19 illustrates an example according to the fourth embodiment, in which one pixel is depicted with four light sources B, C, D and E immediately after the start of depicting the pixel and then one pixel is depicted with five light sources A, B, C, D and E, followed by depicting one pixel with four light sources A, B, C and D. In the example as illustrated in FIG. 19, for example, in the case where one pixel in the sub-scanning direction is set to 600 dpi, the light sources are to be disposed at a pitch of 2,400 dpi. Therefore, as in the example of FIG. 16, a sufficiently fine level of accuracy is possible to be achieved even if the light sources would be shifted suddenly at a certain pixel, however, the pixels can be smoothly moved by smoothing the edges of the pixels by stepwise changing the driving states of the light sources disposed at both ends by pulse width modulation (PWM).

Figure 20:
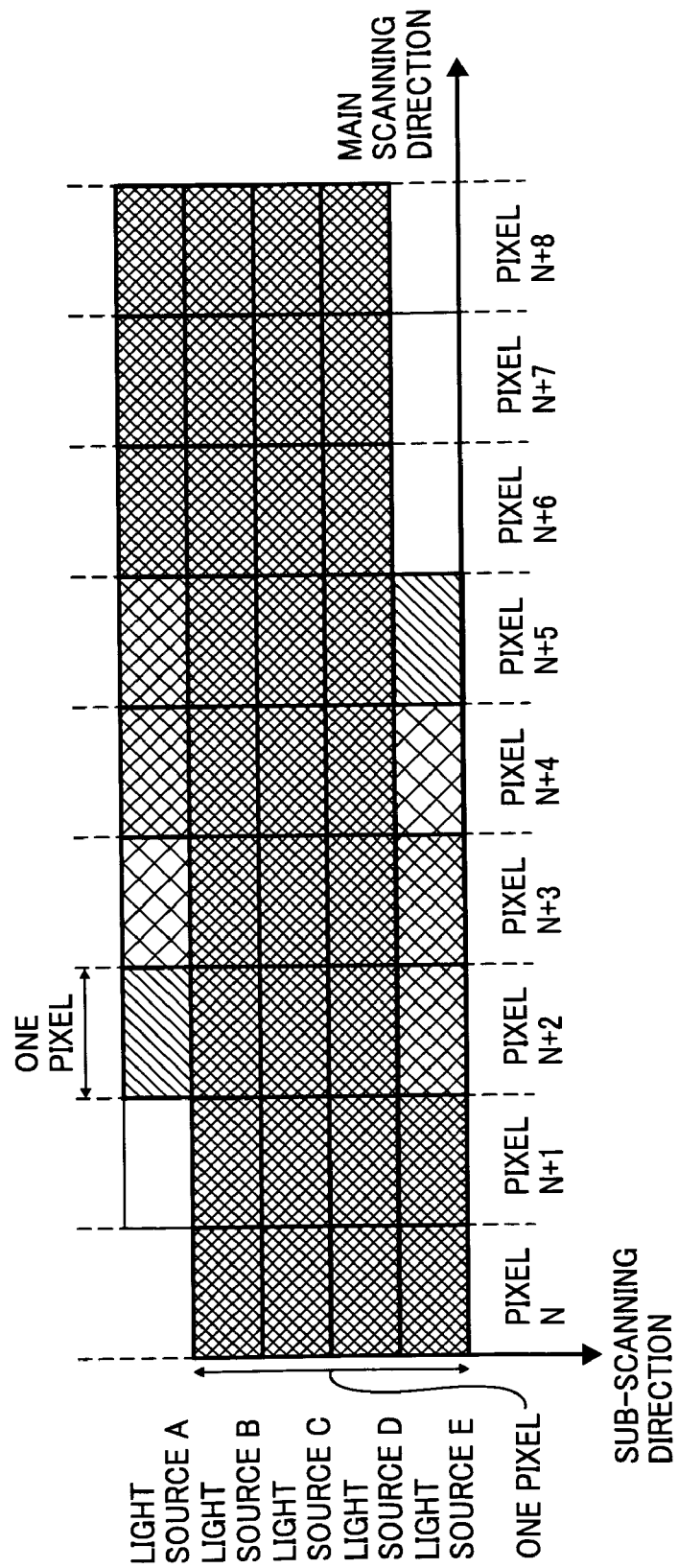
FIG. 20 is a schematic diagram illustrating a specific example of the emission driving control according to the fifth embodiment of the present invention, wherein one pixel is formed in the sub-scanning direction with four light sources.

FIG. 20 illustrates an example of smoothing the edges of the pixels by power modulation (PM) in order to carry out a smooth correction of positions of the pixels, compared with the smoothing processing by pulse width modulation (PWM) as illustrated in FIG. 19. In the case of power modulation, a direct current control part is provided to set a driving current of the light source at a desired value.

Figure 21:
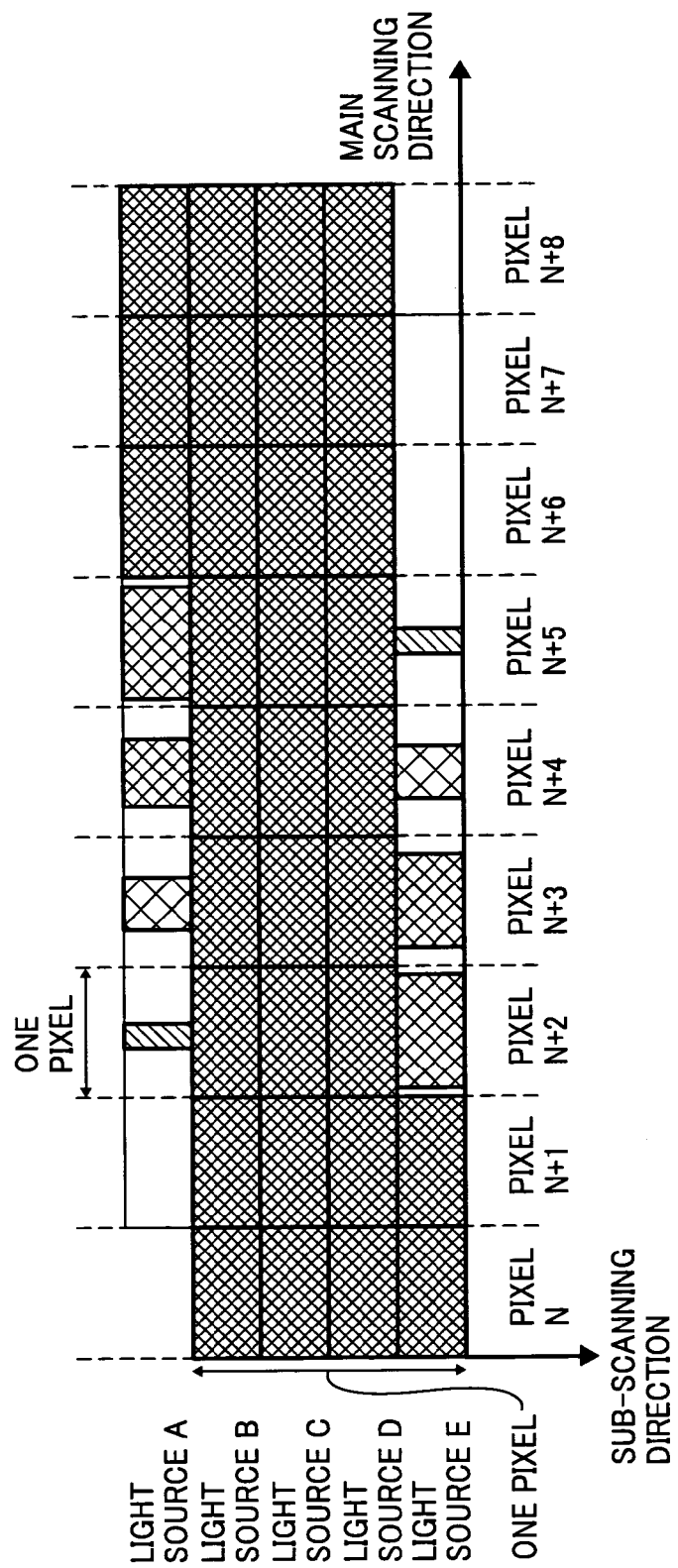
FIG. 21 is a schematic diagram illustrating a specific example of the emission driving control according to the fifth embodiment of the present invention, wherein one pixel is formed in the sub-scanning direction with four light sources.
Figure 22:
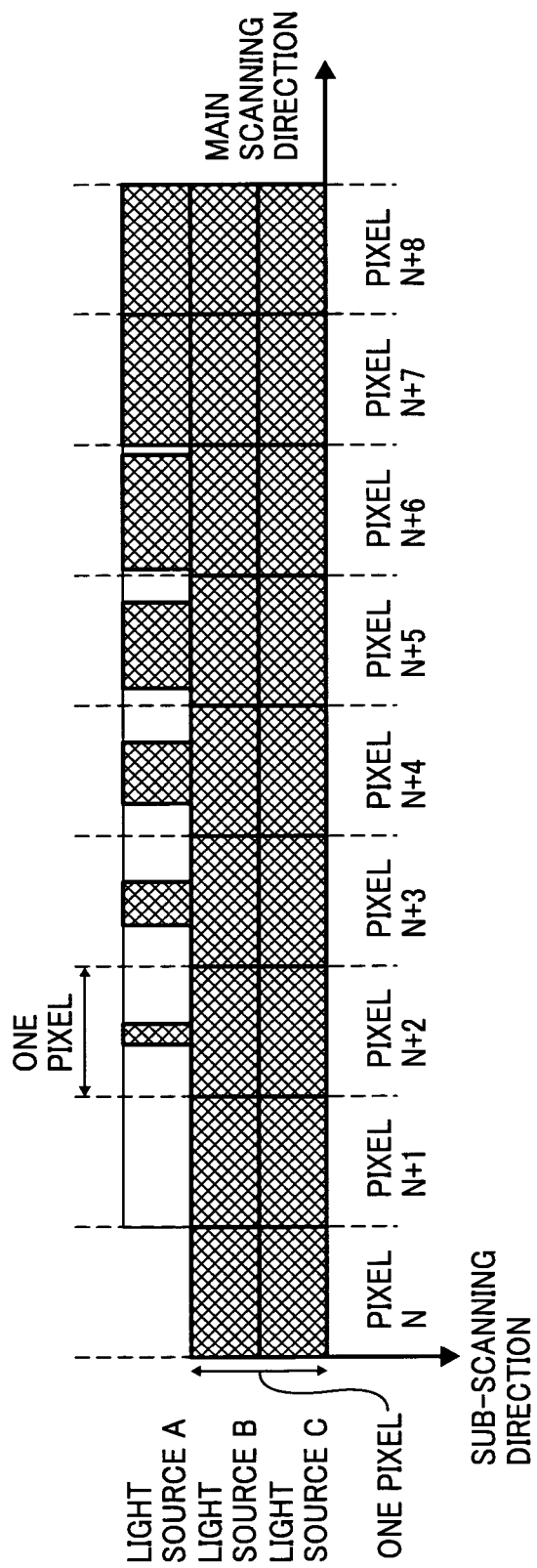
FIG. 22 is a schematic diagram illustrating a specific example of the emission driving control according to the fourth embodiment of the present invention, wherein one pixel is formed in the sub-scanning direction with two light sources.

FIG. 21 illustrates an example of carrying out the smoothing processing by both of PWM and PM to render a smoothing processing. This example enables further smooth movement of the pixels.

In the specific examples as illustrated in FIGS. 17 to 21, the smoothing processing is rendered for the edges of the pixels at both ends by stepwise changing the driving states of the light sources disposed at both ends of the (m+1)-odd light sources in the sub-scanning direction in accordance with the first pattern of the fourth embodiment during a period when one pixel is depicted with the (m+1)-odd light sources.

In contrast to the examples as illustrated in FIGS. 17 to 21, FIG. 22 illustrates a specific example indicating the second control pattern according to the fourth embodiment, in which the smoothing processing for the edges of the pixels by stepwise changing the driving state of the light source only disposed at one end of the (m+1)-odd light sources during a period when one pixel is depicted with the (m+1)-odd light sources.

Although the smoothing processing for stepwisely changing only the driving state of the light source disposed at one end of the (m+1)-odd light sources in the sub-scanning direction can be conducted in the first control pattern according to the fourth embodiment, it is preferred that the specific examples as illustrated in FIGS. 17 to 21 be applied to the smoothing of the edges of the pixels disposed at both ends of the (m+1)-odd light sources in the sub-scanning direction by stepwise changing the driving states of the light sources, because the first control pattern according to the fourth embodiment is more adequate for moving the pixels smoother.

Further, the light source driving control part 50 may be arranged in such a manner that the driving control be conducted in accordance with the third embodiment, on the other hand, in the case of the image being a general two-dimensional image except a line image and the driving control be conducted in accordance with the fourth embodiment, on the other hand, in the case of the image by being a line image.

In each of the above described embodiment, a semiconductor laser (for example, a semiconductor laser array) can be used as n-odd light sources. More specifically, it is preferable to use a surface-emitting laser or a surface-emitting laser array with n-odd surface-emitting lasers disposed in an array-like arrangement on the identical chip as the n-odd light sources.

The surface-emitting laser is possible to save electricity compared with a usual semiconductor laser. It is possible to provide light sources in accordance with a resolution or speed because plural light sources are possible to be disposed with ease and the light sources are possible to be set in an optional arrangement. Therefore, an electric power saving and higher accuracy scanning are possible.

In each of the above described embodiments, one pixel is depicted by the light beams emitted from the m-odd ($n \geq m \geq 2$) light sources out of the n-odd ($n \geq 2$) light sources disposed at different positions at least in the sub-scanning direction. More particularly, one pixel is formed by m-light beams emitted from the m-odd light sources. In this case, it is preferable for an arrangement distance of the adjacent light beams for emitting the light beams in the sub-scanning direction to be less than 5 μm. As illustrated in FIG. 1, since the arrangement and the angle of the light source unit 1001 are set such that the arrangement direction of the light sources has an angle θ relative to the rotation axis of the deflector (the polygon mirror in FIG. 29), it is not always true that the adjacent light sources for emitting the light beams are adjacent to each other.

The arrangement distance of the light sources in the sub-scanning direction is set to be less than 5 μm, for example, 4.8 μm or 2.4 μm, and the optical magnification (accurately, the lateral magnification in the sub-scanning direction of the scanning optical system (the magnification of the direction perpendicular to the optical axis)) is set to be 2.12 times. When the arrangement distance of the light sources in the sub-scanning direction is 4.8 μm, the resolution of the pixel is about 10 μm (2400 dpi), and when the arrangement distance of the light sources in the sub-scanning direction is 2.4 μm, the resolution of the pixel is about 5 μm (4800 dpi), which are fine resolution sufficient to a visual feature of a human eye. Therefore, for example, the steps as illustrated in FIGS. 14, 15 are not recognized by a human eye.

Figures 30, 31:
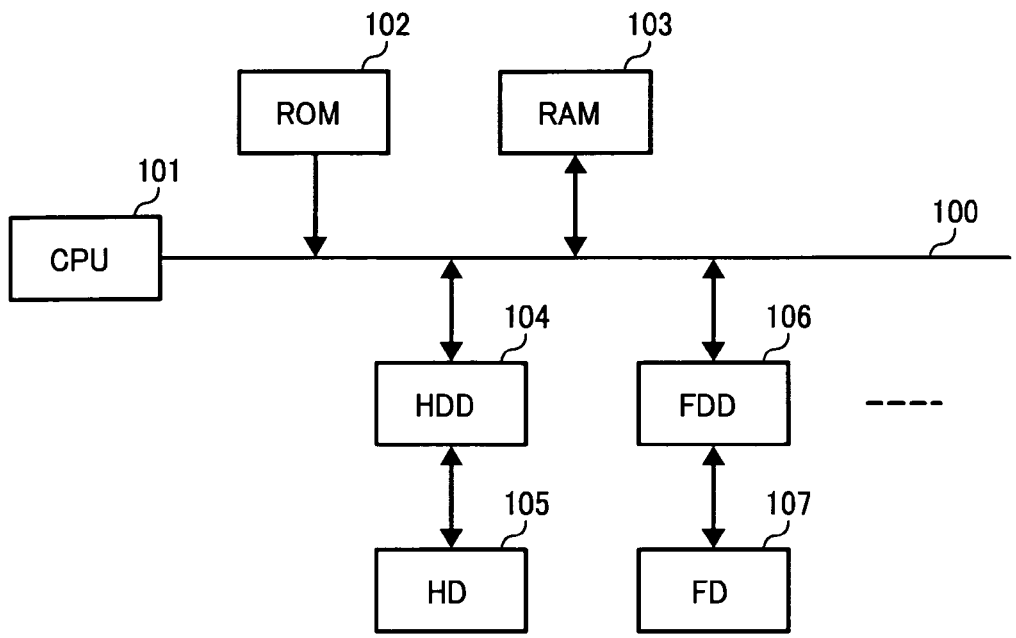
FIG. 30 is a diagram illustrating an example of the hardware configuration of the light source driving control part of the optical scanning device according to the embodiment of the present invention.
FIG. 31 is a comparison chart of resolution and image quality.

FIG. 31 is a view illustrating the comparison between the image qualities when the resolution of the pixel is 1200 dpi and 2400 dpi. When the resolution of the pixel is 2400 dpi, especially, it is known from the FIG. 31 that the sharpness and the jaggy characteristic (level which can not recognize jaggy) are superior. For this reason, it is preferable for the arrangement distance of the light sources in the sub-scanning direction to be less than 5 μm.

In addition, if the optical magnification is increased at two times or more, the light volume of the light source can be controlled. Therefore, a surface-emitting laser having a small light volume can be used of for the light source, and also the transmittance of the lens can be improved while controlling the size of the lens for focusing light on the scanned face.

Fifth Embodiment

A fifth embodiment according to the present invention is directed to an image forming apparatus using the optical scanning device according to the embodiment of the present invention described above.

Figure 23:
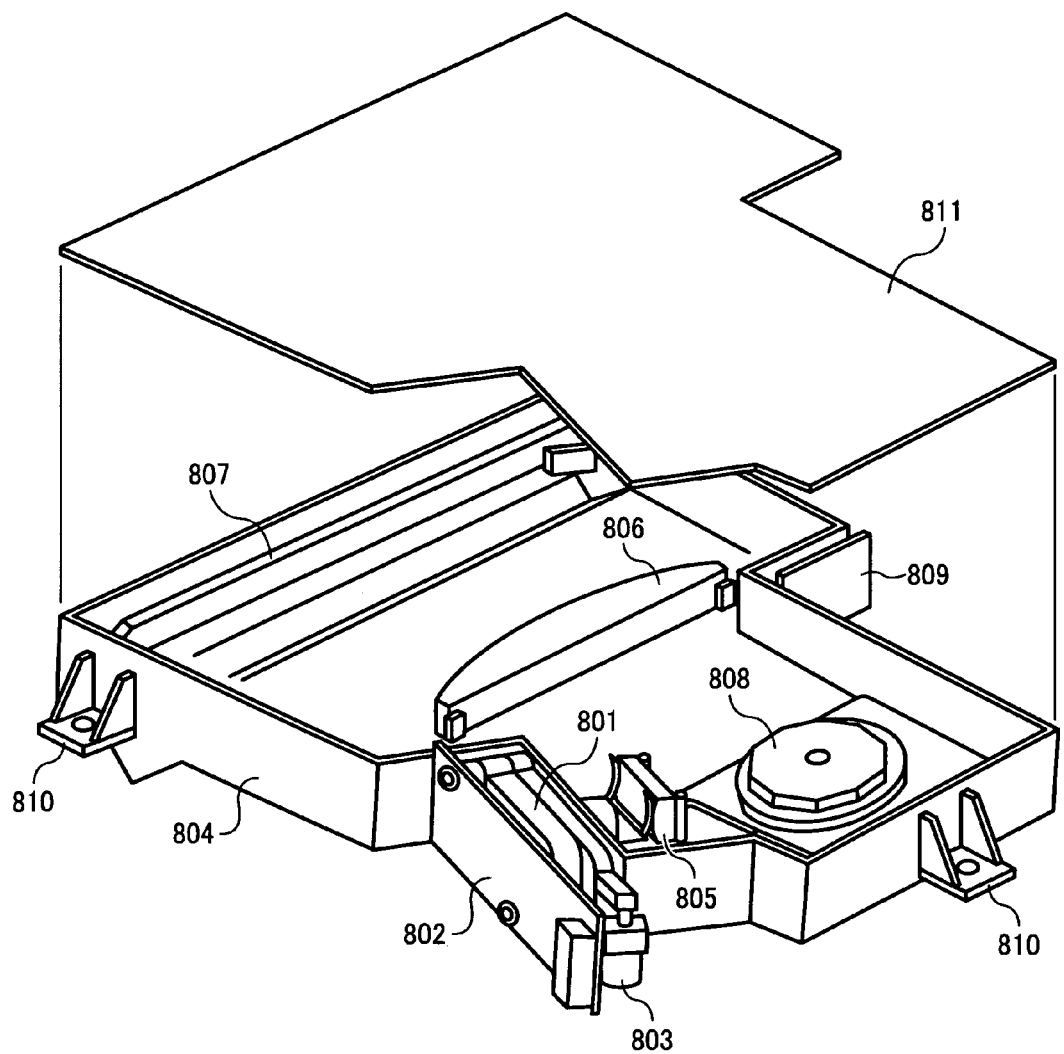
FIG. 23 is a diagram illustrating an example of an image forming apparatus using the optical scanning device according to the embodiment of the present invention.

FIG. 23 illustrates an example of an image forming apparatus of the embodiment of the present invention with the optical scanning device incorporated therein. On the back surface of a light source unit 801 are mounted a printed circuit board 802 with a driving circuit and a pixel clock forming unit formed thereon for controlling the semiconductor laser. The light source unit 801 is in abutment with the wall surface of an optical housing in the direction perpendicular to the optical axis with a spring, and its posture is set by adjusting its inclination with an adjustment screw 803 which in turn is threaded with a projection (not shown) formed on the housing wall surface. Inside the optical housing, a cylindrical lens 805, a polygon motor 808 with a polygon mirror for rotating the polygon mirror, a fθ lens 806, a toroidal lens and a turning mirror 807 are each aligned and held. A printed circuit board 809 with a synchronization detecting sensor mounted thereon is fitted on the outer housing wall surface. The optical housing is sealed at its top with a cover 811 and secured with a frame member of the main body of the image forming apparatus through plural mountings 810 projecting from the wall surface with screws.

As the light source unit 801, there may be used the semiconductor laser array or a surface-emitting laser array, each having plural light sources as illustrated in FIG. 1. Light emitted from the semiconductor laser is deflection-scanned with the polygon mirror mounted on the polygon motor 808 through the cylindrical lens 805. The light flux deflection-scanned is incident to a photosensitive drum (not illustrated) through the fθ lens 806, the toroidal lens and the turning mirror 807, etc. The interval of time between two predetermined points extending in the main-scanning direction is detected with a synchronization detecting sensor by using a scanning light. An amount of the deviation in position of the pixels in the sub-scanning direction is possible to be detected with a position detecting sensor (not illustrated). These values detected are subjected to feedback to the semiconductor laser, modulation circuit or modulation forming part mounted at its previous stage, etc.

Next, a description will be given regarding a multi-beam scanning apparatus using plural light sources.

Figure 24:
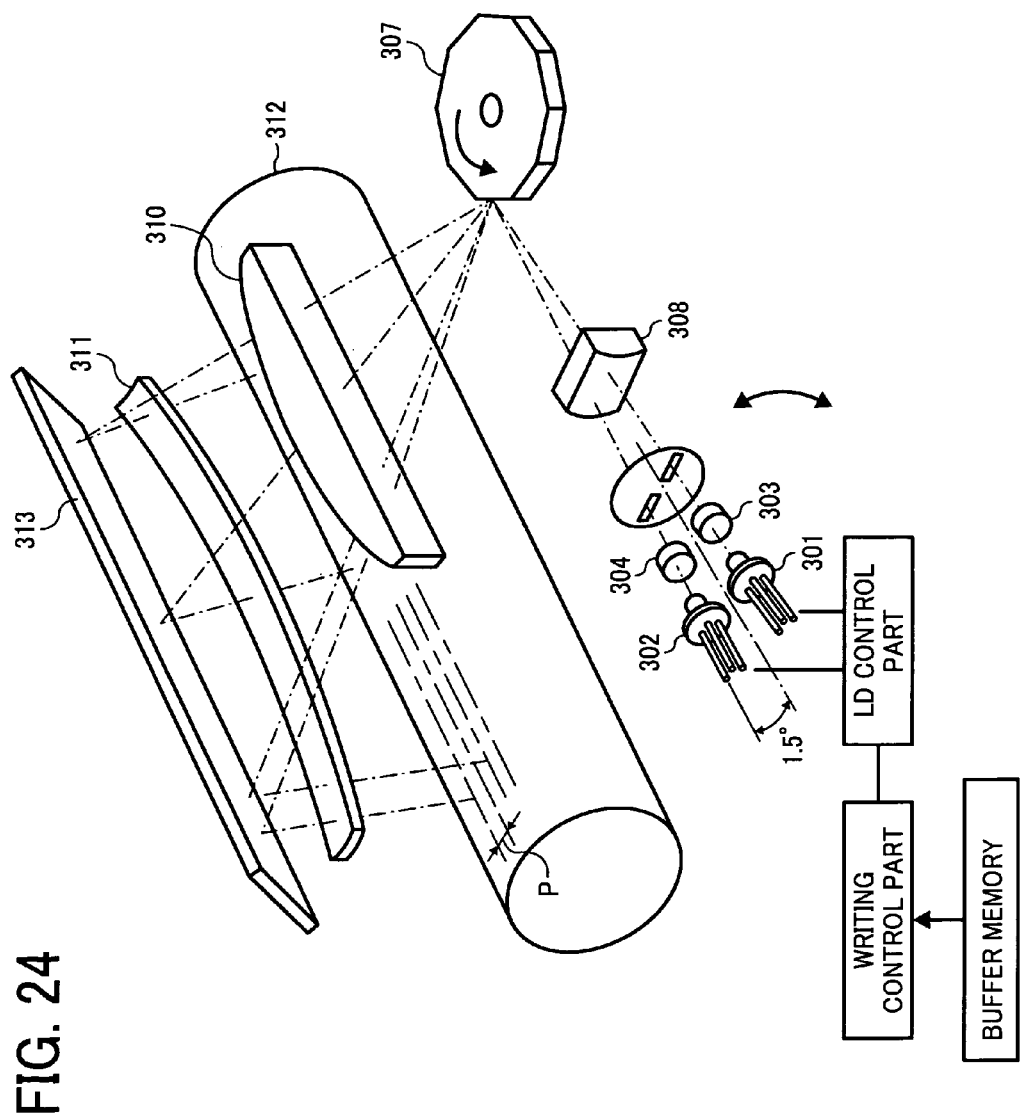
FIG. 24 is a diagram illustrating an example of a multi-beam scanning device.

FIG. 24 illustrates an example of the multi-beam scanning apparatus. As illustrated in FIG. 24, there are used two semiconductor laser arrays (4 light sources) (301, 302) with two light sources arranged up and down at a distance (ds=25 μm) between the two light sources, and eight light sources are disposed.

As illustrated in FIG. 24, the semiconductor laser arrays 301 and 302 are disposed in such a manner that the optical axes of the lasers come into coincidence with the optical axes of collimating lenses 303 and 304, respectively. As the semiconductor laser arrays 301 and 302 are arranged each at an outgoing angle symmetrically with the main-scanning direction, the axes of the lasers outgoing from the semiconductor laser arrays 301 and 302 intersect with each other at the reflection point of the polygon mirror 307. Plural laser beams emitted from each of the semiconductor laser arrays 301 and 302 are scanned collectively with the polygon mirror 307 through the cylindrical lens 308 and form an image on the photosensitive member 312 with the folded mirror 313 through the fθ lens 310 and the toroidal lens 311. A buffer memory stores printing data for one line for each of the light sources, and the printing data stored in the buffer memory is read for each one mirror surface of the polygon mirror and recorded in every four lines simultaneously.

A difference in wavelengths of the plural light sources structuring the multi-beams produces a difference in the optical scanning length. In order to correct this difference, the difference of the optical scanning length is possible to be corrected at an accuracy of the pixel clock by shifting a phase of the pixel clock, thereby alleviating a deviation in the scanning light.

Figure 25:
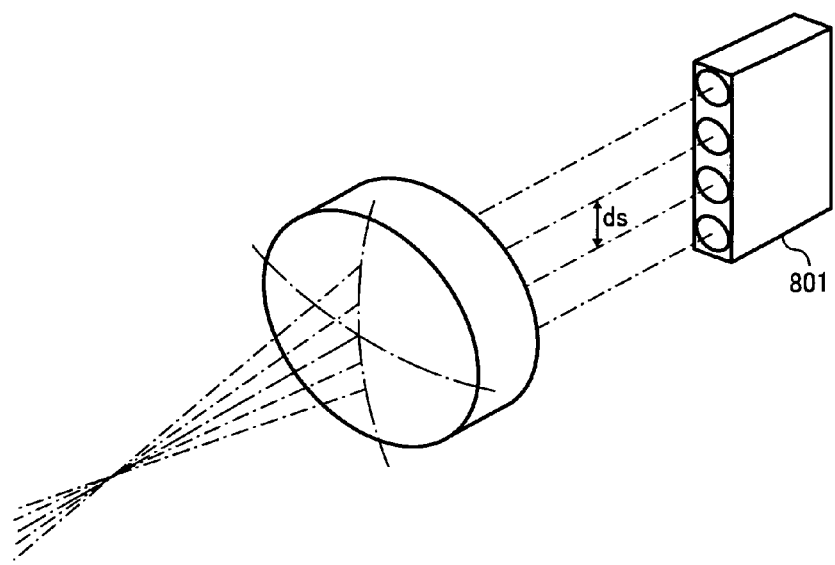
FIG. 25 is a diagram illustrating an example of a pixel forming device of the optical scanning device according to the present invention.

FIG. 25 illustrates an example of a light source unit for the pixel forming device of the optical scanning device. The light source unit is structured of a laser array with four light sources disposed in the sub-scanning direction when the longitudinal direction as illustrated in the drawing is defined as the sub-scanning direction.

Figure 26:
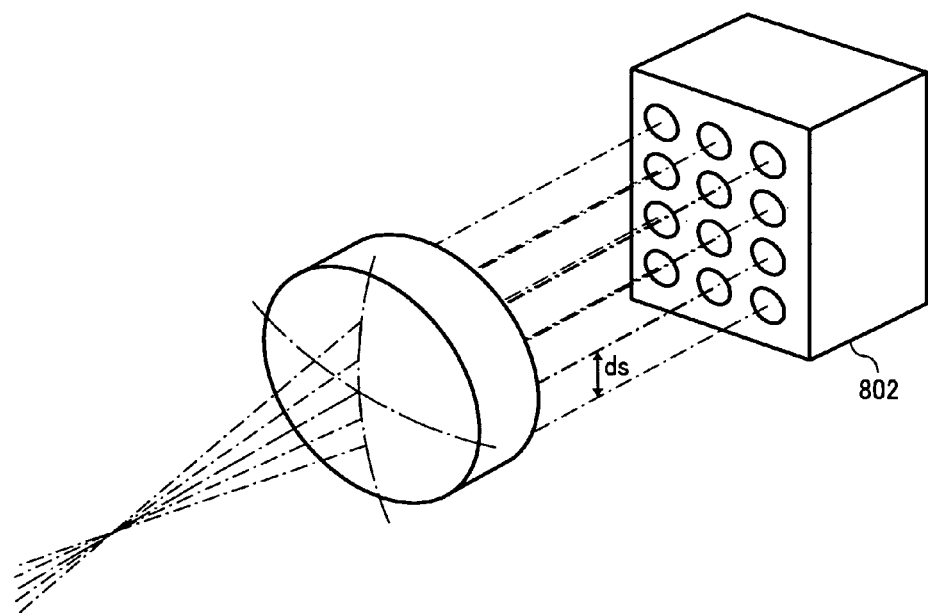
FIG. 26 is a diagram illustrating another example of a pixel forming device of the optical scanning device according to the present invention.

FIG. 26 illustrates another example of a light source unit for the pixel forming device of the optical scanning device. The light source unit is structured of a surface-emitting laser array with plural surface-emitting lasers disposed in an array-shaped arrangement in such a manner that the light sources (surface-emitting lasers) are disposed in a total number of 12 of which three light sources are disposed along the lateral direction and four light sources are disposed along the longitudinal direction.

Figure 32:
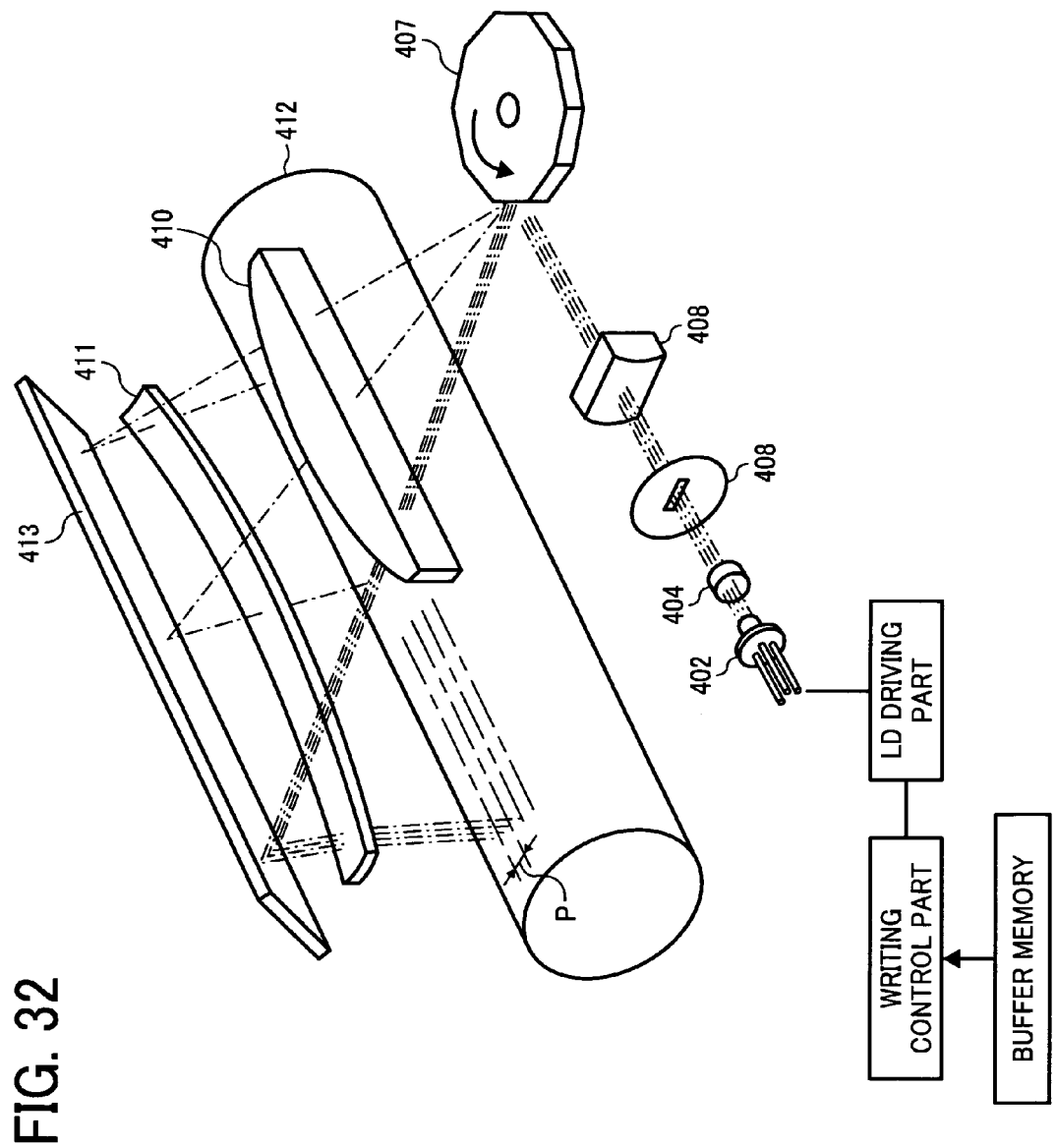
FIG. 32 is a view illustrating one example of a multi beam scanning device using a surface emitting laser array.

Next, it will be described for a multi-beam scanning device using a surface-emitting laser array on the light source unit. FIG. 32 is a view illustrating one example of the multi-beam scanning device using the surface-emitting laser array in the light source unit. In the example illustrated in FIG. 32, a surface-emitting laser array 402 is used instead of the two light sources 301, 302 illustrated in FIG. 24.

In FIG. 32, a plurality of light beams emitted from the surface-emitting laser array 402 is scanned together by a polygon mirror 407 via a collimate lens 404 and a cylinder lens 408, and imaged on a photoreceptor 412 of a scanned face by a turning mirror 413 via a fθ lens 410 and a toroidal lens 411. Printing data for one line is stored in a buffer memory for each of the light sources. The printing data stored in the buffer memory is read at each face of the polygon mirror, and recorded simultaneously at plural lines.

Moreover, a difference in an optical scanning length generates by a difference in a wavelength of the light sources for constituting the multi-beams. In order to correct this difference, the difference in the optical scanning length is corrected with the accuracy of the pixel clock by conducting phase shift of the pixel clock; thereby, the variation of the scanning light can be reduced.

Figure 33:
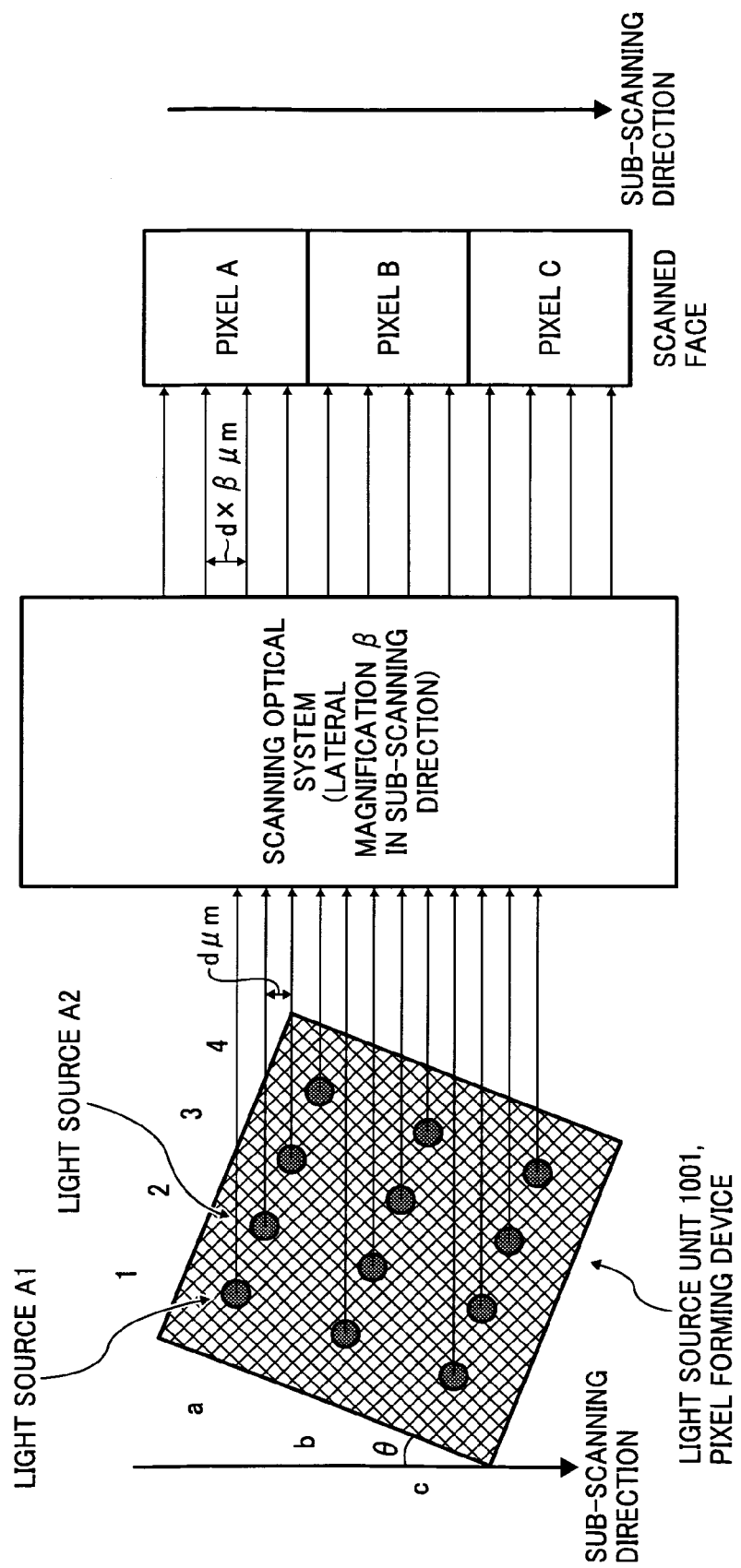
FIG. 33 is diagram illustrating a relationship among an image forming devices a scanning optical system and an image to be formed

FIG. 33 is a view illustrating an example that a plurality of light beams emitted from the surface-emitting laser array 402 is scanned on the scanned face via the scanning optical system. In this case, similar to the example illustrated in FIG. 32, the scanning optical system includes a collimate lens 403, a cylinder lens 408, a polygon mirror 407, a fθ lens 410, a toroidal lens 411, a turning mirror 413, and the like.

FIG. 33 illustrates an example that a lateral magnification B in the sub-scanning direction on the scanned face by various lenses disposed in the optical path from the light source to the scanned face is set larger than 2 when a plurality of light beams emitted from a plurality of light sources disposed at a predetermined distance d in the sub-scanning direction is led on the scanned face via the lenses for optical scanning. In the example illustrated in FIG. 33, one pixel is depicted by four light sources, and three pixels can be simultaneously depicted by 12 light sources. More particularly, one pixel, i.e., a pixel A is depicted by the light beams from four light sources a1, a2, a3, a4. Similarly, a pixel B is depicted by the light beams from four light sources b1, b2, b3, b4. A pixel C is depicted by the light beams from four light sources c1, c2, c3, c4. More particularly, the three pixels are depicted on the scanned face by the above 12 light sources.

It is considered for a case that an arrangement distance d of the light sources in the sub-scanning direction is 4.8 μm and the lateral magnification in the sub-scanning direction $|\beta|=2.12$. In this case, the distance of the adjacent light beams on the scanned face in the sub-scanning direction (hereinafter refer to as a pitch between the light beams in the sub-scanning direction) is 4.8 μm×2.12=10.1 μm, and resolution of 2400 dpi in the sub-scanning direction is obtained.

Similarly, it is considered for a case that an arrangement distance d of the light sources in the sub-scanning direction is 2.4 μm and the lateral magnification in the sub-scanning direction |β|=2.12. In this case, the pitch between the light beams in the sub-scanning direction on the scanned face is 2.4 μm×2.12=5.0 μm, and resolution of 4800 dpi in the sub-scanning direction is obtained.

On the other hand, if the lateral magnification in the sub-scanning direction is |β|≦2, when a desired beam spot diameter (for example 50×60 μm in the main and sub-scanning directions) is obtained in the sub-scanning direction on the scanned face, it is necessary to reduce the aperture diameter. Therefore, the light passing through the aperture stop is decreased resulting in the shortage of the light volume. Especially, when using the surface-emitting laser having a small light volume as the light source, the light volume shortage becomes a big problem.

If the lateral magnification in the sub-scanning direction is set to be |β⊕≦2, the size in the lens for focusing light on the scanned face, the toroidal lens 411 in FIG. 32 is increased so as to approach the photoreceptor 412. Therefore, the layout of the lenses in the device becomes difficult, resulting in the increase in the costs. Moreover, if the lateral magnification in the sub-scanning direction is set to be |β|≦2, it is necessary to put the cylindrical lens 408 closer to the polygon motor 407. In this case, the temperature of the cylindrical lens 408 increases by the heat of the polygon motor, the beam spot diameter and the beam pitch change by the temperature change of the optical characteristics. Consequently, a stable image can not be obtained. These problems can be reduced by setting the lateral magnification in the sub-scanning direction to be |β|>2.

Figure 27:
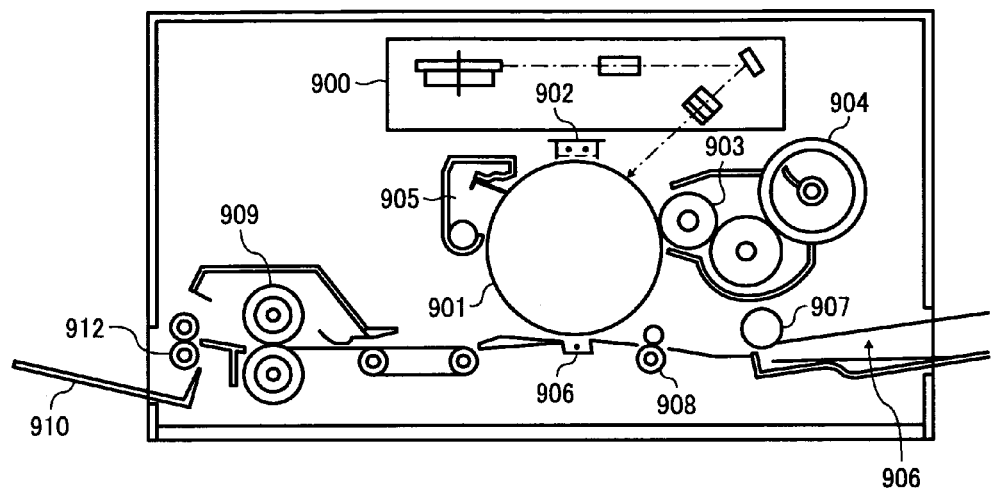
FIG. 27 is a diagram illustrating an example of the structure of an image forming apparatus according to the embodiment of the present invention.

FIG. 27 illustrates an example of an image forming apparatus according to the embodiment of the present invention. A photosensitive drum 901 whose surface is to be scanned is provided on the periphery thereof with a charger 902 for charging the photosensitive body with high voltage, a developing roller 903 for developing an electrostatic latent image recorded on the surface of the photosensitive member 901 with the optical scanning device 900 by adhering charged toner thereonto, a toner cartridge 904 for supplying the toner to the developing roller 903, and a cleaning casing 905 for scraping the toner remaining on the photosensitive drum 901 and storing it. The latent images are recorded simultaneously by plural lines on every surface of the photosensitive drum 901. A recording paper is supplied from a paper tray 906 with a paper feeding roller 907 and is fed in the sub-scanning direction from a resist roller pair 908 at a timing of start of recording. As the recording paper passes through the photosensitive drum 901, the toner is transferred thereonto with a transfer charger 906 and fixed thereon with a fixing roller 909 to finish printing. Thereafter, the recording paper is discharged onto a paper discharging tray 910 with a paper discharging roller 912. By applying the optical scanning device according to the embodiment of the present invention as the optical scanning device 900 of the image forming apparatus as described above, the deviation in position of the scanning line in the sub-scanning direction is possible to be corrected at a high accuracy and an image of a high quality is obtained.

Figure 28:
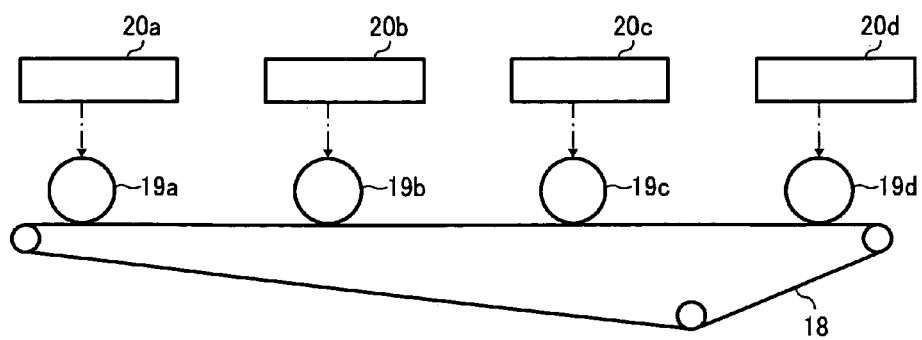
FIG. 28 is a diagram illustrating an example of a color image forming apparatus using the optical scanning device according to the embodiment of the present invention.

The present invention is applicable to a color image forming apparatus. FIG. 28 illustrates an example in which the color image forming apparatus is mounted on a tandem color machine working as an image forming apparatus with plural photosensitive bodies. The tandem color machine is provided with an individual photosensitive member for each of colors, i.e. cyan, magenta, yellow and black, and an optical scanning system is arranged to form a latent image on each surface of the photosensitive bodies through an individual light path. Therefore, a deviation in position of the scanning line in the sub-scanning direction, which is caused to occur on each of the photosensitive body, may have their own features in many cases.

As illustrated in FIG. 28, reference numeral 18 denotes a transfer belt, reference numerals 19a, 19b, 19c and 19d are photosensitive bodies corresponding to cyan, magenta, yellow and black colors, respectively, and reference numerals 20a, 20b, 20c and 20d are optical scanning devices for the corresponding respective colors.

By applying the optical scanning device of the embodiment of the present invention to the optical scanning devices 20a, 20b, 20c and 20d, the correction of a deviation in position of the scanning line in the sub-scanning direction is possible to be achieved at a high accuracy and provide an image of a high quality. In particular, the color image forming apparatus is possible to decrease a deviation in color due to a control over the deviation in position among the colors, thereby achieving an image of favorable color reproducibility.

FIG. 30 illustrates an example of a hardware configuration of the light source driving control part 50 of the optical scanning device according to the embodiment of the present invention. In this example, the light source driving control part 50 includes CPU 101, ROM 102, RAM 103, hard disk drive (HDD) 104, hard disk (HD) 105, flexible disk drive (FDD) 106, flexible disk (FD) 107 and so on, which are connected together through bus 100.

The CPU 101 controls the device in its entirety. The ROM 102 stores control programs. The RAM 103 is used as a working area of the CPU 101. The HDD 104 operates read/write controls for the HD 105 in accordance with the control by the CPU 101. Data is written in the HD 105 with the HDD 104 and the written data is stored therein. The FDD 106 executes the read/write controls over data of the FD 107 in response to the control of the CPU 101. Date is written with the FDD 106, and the FD 107 stores the written data. The FD 107 is attached detachably.

The processing of the light source driving control part 50 in the working embodiment of the present invention is possible to be conducted by way of programs for executing a computer (for example, CPU 101).

A program for executing the processing of the light source driving control part 50 in accordance with the working embodiment of the present invention is executable by recording it on a recording medium readable with a computer, such as the HDD 104, FD 107, CD-ROM, MO, DVD, and so on, and reading the recorded program from the recording medium with the computer. This program may be distributed through a network such as internet and so on.

As described above, according the optical scanning device of one embodiment of the present invention, one pixel is depicted by the light beams emitted from the m-odd (n≧m≧2) light sources of the n-odd (n≧2) light sources disposed at different positions at least in the sub-scanning direction. Therefore, the gravity center of the pixel can be moved in the sub scanning direction by changing the emitting state of the m-odd light sources for depicting one pixel.

In addition, according to the optical scanning device of one embodiment of the present invention, in the light beams for depicting the one pixel, the arrangement distance of the adjacent light sources for emitting the light beams in the sub-scanning direction is less than 5 μm. Therefore, by setting the optical magnification about 2 times, the pixel resolution can be about 10 μm (2400 dpi), and fine resolution sufficient to the visual feature of a human eye can be obtained.

In addition, according to the optical scanning device of one embodiment of the present invention, by moving the gravity center of the pixel in the sub-scanning direction, the deviation in position of the scanning line resulting from optical factors or mechanical factors can be corrected with high accuracy.

According to the optical scanning device of one embodiment of the present invention, the gravity center of the pixel can be moved in the sub-scanning direction with high accuracy by controlling the emitting time ratio of the light sources such that a total emitting time or a total exposure time of the light sources for depicting one pixel becomes constant.

Moreover, according to the optical scanning device of one embodiment of the present invention, the gravity center of the pixel can be moved in the sub-scanning direction with high accuracy by controlling the emitting level ratio of the light sources such that a total exposure energy of the light sources for depicting one pixel becomes constant.

Furthermore, according to the optical scanning device of one embodiment of the present invention, by conducting the smoothing processing for stepwisely changing the emitting state of the light source disposed in at least one of the end portions in the sub-scanning direction of the light sources for depicting one pixel when conducting the emission driving control, the gravity center of the pixel can be smoothly moved in the sub-scanning direction.

According to the optical scanning device of one embodiment of the present invention, since the m-odd light sources simultaneously depict the L-odd pixels arranged in L-groups (L≧2) in the sub-scanning direction, a plurality of pixels can be depicted at high speed.

According to the optical scanning device of one embodiment of the present invention, the surface-emitting laser is used for the light source, the electric power can be saved.

In addition, according to the image forming apparatus of one embodiment of the present invention, the gravity center of the pixel can be moved in the sub-scanning direction with high accuracy, and the deviation in position of the scanning line in the sub-scanning direction can be corrected with high accuracy, so a high quality image can be formed.

According to a color image forming apparatus of one embodiment of the present invention, the gravity center of the pixel can be moved in the sub-scanning direction with high accuracy, the deviation in position of the scanning line for each of the colors in the sub-scanning direction can be corrected with high accuracy. Therefore, a high quality image with reduced color shift can be formed when forming a color image.

In addition, the present invention is applicable to a laser printer, a digital copying machine or the like.

Although the present invention has been described in themes of exemplary embodiments, it is not limited thereto. It should be appreciated that various may be made in the embodiments described by person skilled in the art without departing from the scope of the present invention as defined by the following claims,

What is claimed is:

1. An optical scanning device, comprising:
    n-odd (n≧2) light sources disposed at different positions at least in a sub-scanning direction;
    a pixel forming part in which one pixel is depicted by light beams emitted from m-odd (n≧m≧2) light sources of the n-odd light sources, and a distance of adjacent light sources for emitting the light beams in the sub-scanning direction is less than 5 μm; and
    a light source driving control part configured to control an emitting state of the light sources for depicting the one pixel and conduct an emission driving control for moving a gravity center of the one pixel in the sub-scanning direction.

2. The optical scanning device according to claim 1, further comprising a sub-scanning direction pixel position detecting part configured to detect a deviation in position of the one pixel in the sub-scanning direction, wherein the light source driving control part conducts the emission driving control according to a detection result of the sub-scanning direction pixel position detection part.

3. The optical scanning device according to claim 2, wherein the light source driving control part controls an emitting time ratio of the light sources such that a total emitting time or a total exposure area of the light sources for depicting the one pixel becomes constant.

4. The optical scanning device according to claim 2, wherein the light source driving control part controls an emitting level ratio of the light sources such that a total exposure energy of the light sources for depicting the one pixel becomes constant.

5. The optical scanning device according to claim 1, wherein the light source driving control part controls an emitting time ratio of the light sources such that a total emitting time or a total exposure area of the light sources for depicting the one pixel becomes constant.

6. The optical scanning device according to claim 1, wherein the light source driving control part controls an emitting level ratio of the light sources such that a total exposure energy of the light sources for depicting the one pixel becomes constant.

7. The optical scanning device according to claim 1, wherein after start of the emission driving control, the one pixel is depicted by the light beams emitted from (m+1)-odd light sources, and after end of the emission driving control, the one pixel is depicted by m-odd light sources shifted at one light source in the sub-scanning direction relative to the m-odd light sources for depicting the one pixel before the emission driving control.

8. The optical scanning device according to claim 7, wherein the light source driving control part conducts a smoothing processing for stepwisely changing the emitting state of at least one of a light source positioned in an upper end and a light source positioned in a lower end in the sub-scanning direction in the light sources for depicting the one pixel by using at least one of a pulse width modulation (PWM) and a power modulation (PM), and smoothly moves the gravity center of the one pixel in the sub-scanning direction.

9. The optical scanning device according to claim 1, wherein after start of the emission driving control, the one pixel is depicted by the light beams emitted from (m+1)-odd light sources.

10. The optical scanning device according to claim 9, wherein the light source driving control part conducts a smoothing processing for stepwisely changing the emitting state of at least one of a light source positioned in an upper end and a light source positioned in a lower end in the sub-scanning direction in the light sources for depicting the one pixel by using at least one of a pulse width modulation (PWM) and a power modulation (PM), and smoothly moves the gravity center of the one pixel in the sub-scanning direction.

11. The optical scanning device according to claim 1, wherein the m-odd light sources simultaneously depict L-odd pixels arranged in L-groups (L≧2) in the sub-scanning direction.

12. An image forming apparatus, comprising:
n-odd (n≧2) light sources disposed at different positions at least in a sub-scanning direction,
wherein one pixel is depicted by light beams emitted from m-odd (n≧m≧2) light sources of the n-odd light sources and a distance of adjacent light sources for emitting the light beams in the sub-scanning direction is less than 5 μm.

13. The optical scanning device according to claim 1, wherein a surface-emitting laser is used in the light source.

14. An image forming apparatus comprising the optical scanning device set forth in claim 1.

15. A color image forming apparatus comprising the optical scanning device set forth in claim 1.

16. An optical scanning method, comprising the steps of:
providing n-odd (n≧2) light sources at different positions at least in a sub-scanning direction;
depicting one pixel by light beams emitted from m-odd (n≧m≧2) light sources of the n-odd light sources;
setting a distance of adjacent light sources for emitting the light beams in the sub-scanning direction to be less than 5 μm;
controlling an emitting state of the light sources for depicting the one pixel; and
conducting an emission driving control for moving a gravity center of the one pixel in the sub-scanning direction.

17. The optical scanning method according to claim 16, further comprising the steps of: detecting a deviation in position of the one pixel in the sub-scanning direction; and performing the emission driving control according to a detection result.

18. The optical scanning method according to claim 17, further comprising the steps of providing an image forming apparatus, scanning the light beams emitted from the m-odd light sources in a scanning direction, and performing said scanning within said image forming apparatus.

19. The optical scanning method according to claim 16, wherein after start of the emission driving control, the one pixel is depicted by light beams emitted from (m+1)-odd light sources, and after end of the emission driving control, the one pixel is depicted by m-odd light sources shifted at one light source in the sub-scanning direction relative to the m-odd light sources for depicting the one pixel before the emission driving control.

20. The optical scanning method according to claim 16, wherein after start of the emission driving control, the one pixel is depicted by the light beams emitted from (m+1)-odd light sources.

* * * * *